United States Patent
Giannini

(10) Patent No.: US 11,192,637 B2
(45) Date of Patent: Dec. 7, 2021

(54) BOUNDARY LAYER CONTROL SYSTEM AND DEVICE

(71) Applicant: Aurora Flight Sciences Corporation, Manassas, VA (US)

(72) Inventor: Francesco Giannini, Falls Church, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 364 days.

(21) Appl. No.: 16/159,351

(22) Filed: Oct. 12, 2018

(65) Prior Publication Data

US 2020/0115040 A1    Apr. 16, 2020

(51) Int. Cl.
| | |
|---|---|
| B64C 21/00 | (2006.01) |
| B64C 21/02 | (2006.01) |
| B64C 3/50 | (2006.01) |
| B64C 9/24 | (2006.01) |
| B64C 13/16 | (2006.01) |
| B64C 9/18 | (2006.01) |

(52) U.S. Cl.
CPC .............. *B64C 21/025* (2013.01); *B64C 3/50* (2013.01); *B64C 9/18* (2013.01); *B64C 9/24* (2013.01); *B64C 13/16* (2013.01); *B64C 2230/04* (2013.01)

(58) Field of Classification Search
CPC ....... B64C 21/02; B64C 21/025; B64C 21/04; B64C 21/06; B64C 21/08; B64C 2230/04
See application file for complete search history.

(56) References Cited

U.S. PATENT DOCUMENTS

| | | | | |
|---|---|---|---|---|
| 2,406,919 | A * | 9/1946 | Stalker | B64C 21/025 244/90 R |
| 3,065,928 | A * | 11/1962 | Dornier | B64C 23/08 244/10 |
| 4,285,482 | A * | 8/1981 | Lewis | B64C 21/04 244/207 |
| 4,398,688 | A * | 8/1983 | Williams | B64C 21/04 244/207 |
| 6,253,126 | B1 | 6/2001 | Palmer | |
| 6,368,059 | B1 * | 4/2002 | Maines | B63H 1/15 416/42 |
| 7,114,387 | B2 | 10/2006 | Omotani | |

(Continued)

OTHER PUBLICATIONS

Hancock, J. P., "Test of a High Efficiency Transverse Fan," AIAA-80-1243, AIAA/SAE/ASME 16th Joint Propulsion Conference, Jun. 30-Jul. 6 2, 1980, Hartford, Connecticut.

(Continued)

*Primary Examiner* — Richard G Davis
(74) *Attorney, Agent, or Firm* — Michael Stanley Tomsa; McAndrews, Held & Malloy, Ltd.; Eugene H. Nahm

(57) ABSTRACT

A boundary layer control (BLC) system for embedment in a flight surface having a top surface, a bottom surface, a leading edge, and a trailing edge. The BLC system may comprises an actuator having a crossflow fan and an electric motor to drive the crossflow fan about an axis of rotation. The actuator may be embedded within the flight surface and adjacent the leading edge. In operation, the actuator is configured to output local airflow via an outlet channel through an outlet aperture adjacent the top surface to energize a boundary layer of air adjacent the top surface of the flight surface.

19 Claims, 14 Drawing Sheets

(56) References Cited

U.S. PATENT DOCUMENTS

| | | | |
|---|---|---|---|
| 8,128,038 B2* | 3/2012 | Whitehouse | B64C 23/06 |
| | | | 244/214 |
| 2011/0108672 A1* | 5/2011 | Shmilovich | B64C 9/38 |
| | | | 244/207 |
| 2012/0043428 A1* | 2/2012 | Goelling | B64C 21/08 |
| | | | 244/208 |
| 2013/0062473 A1* | 3/2013 | Golling | B64C 21/025 |
| | | | 244/208 |
| 2014/0119878 A1* | 5/2014 | Shmilovich | B64C 21/04 |
| | | | 415/1 |
| 2016/0200420 A1 | 7/2016 | McKenna | |
| 2017/0355451 A1* | 12/2017 | Zha | B64C 21/08 |
| 2019/0009890 A1* | 1/2019 | Baker, Jr. | B64C 3/141 |
| 2019/0127042 A1* | 5/2019 | Zha | F15D 1/0055 |

OTHER PUBLICATIONS

Mohamed, A. et al. "Bioinspired Wing-Surface Pressure Sensing for Attitude Contiol of Micro Air Vehicles." Journal of Aircraft, 52(3). Jun. 2015.

* cited by examiner

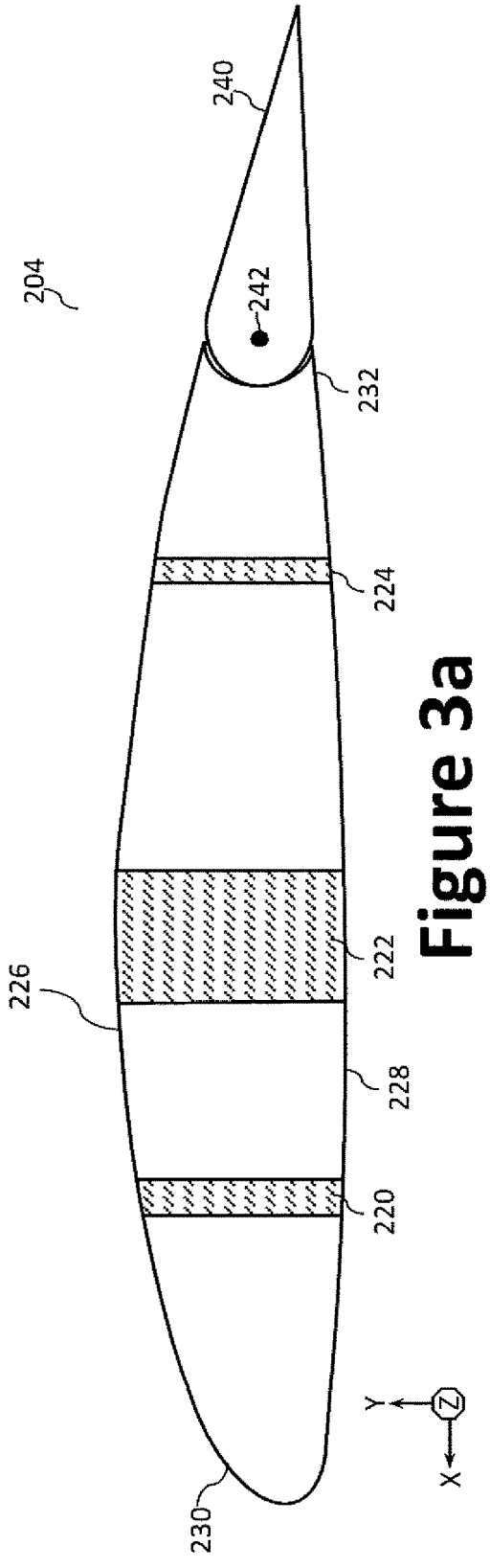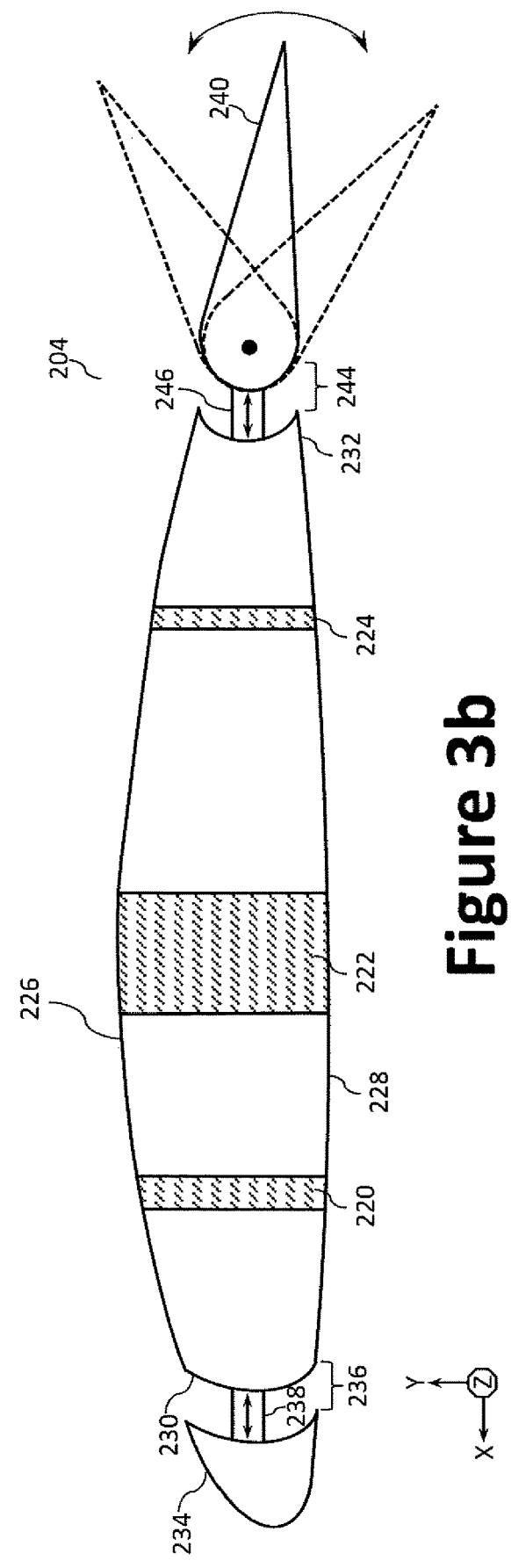
Figure 3a
Figure 3b

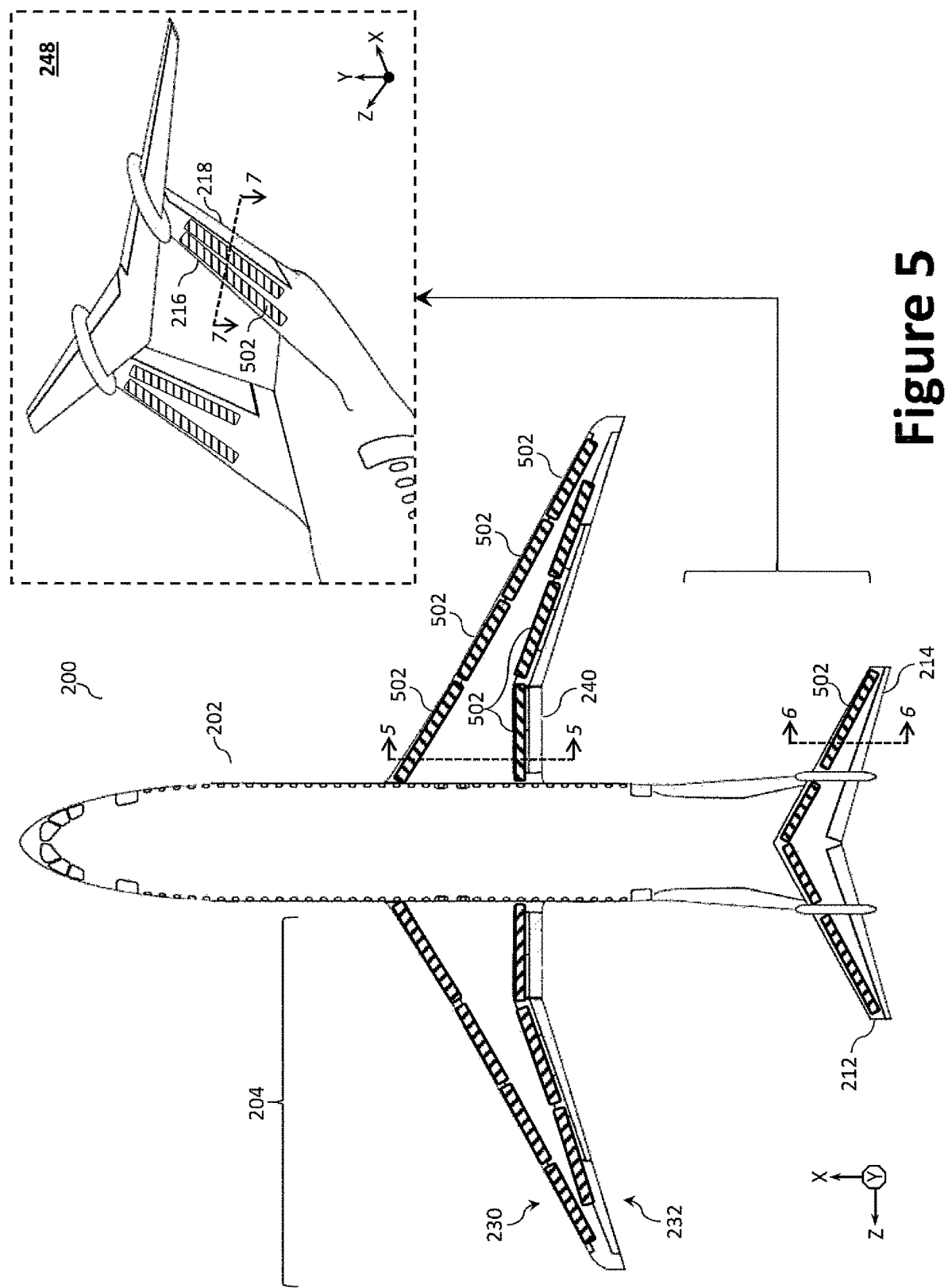

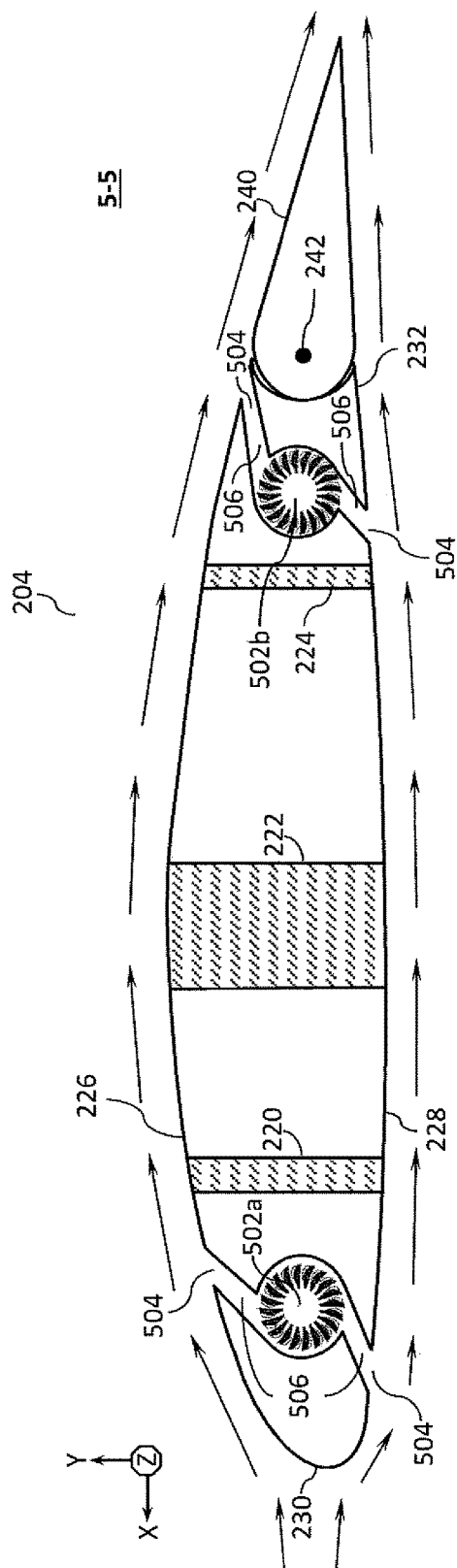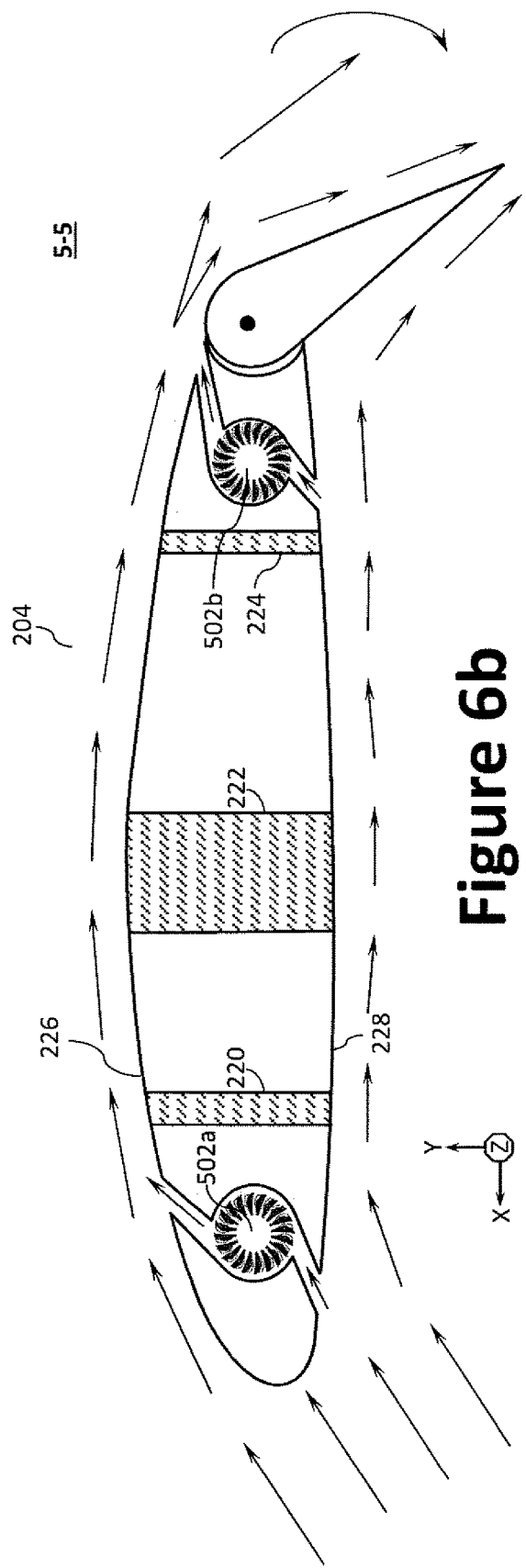
Figure 6a
Figure 6b

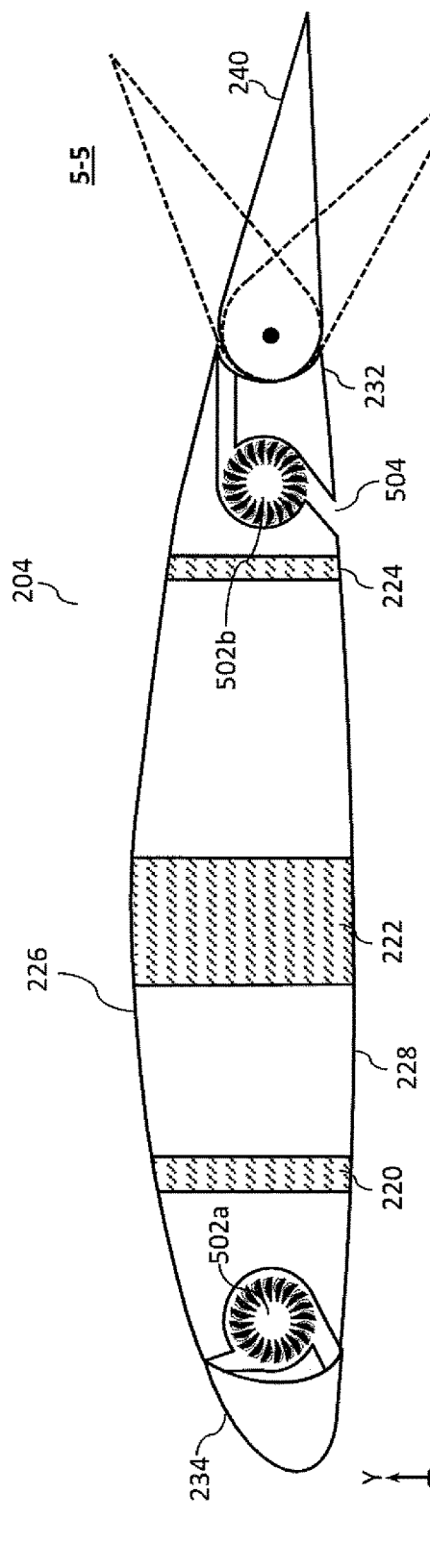
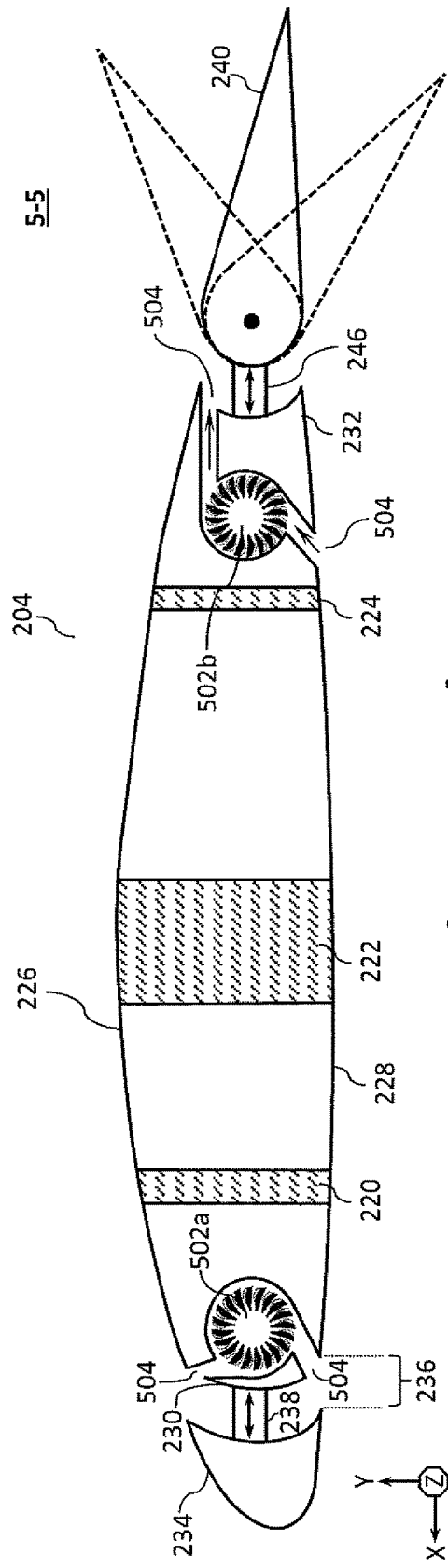
Figure 6c
Figure 6d

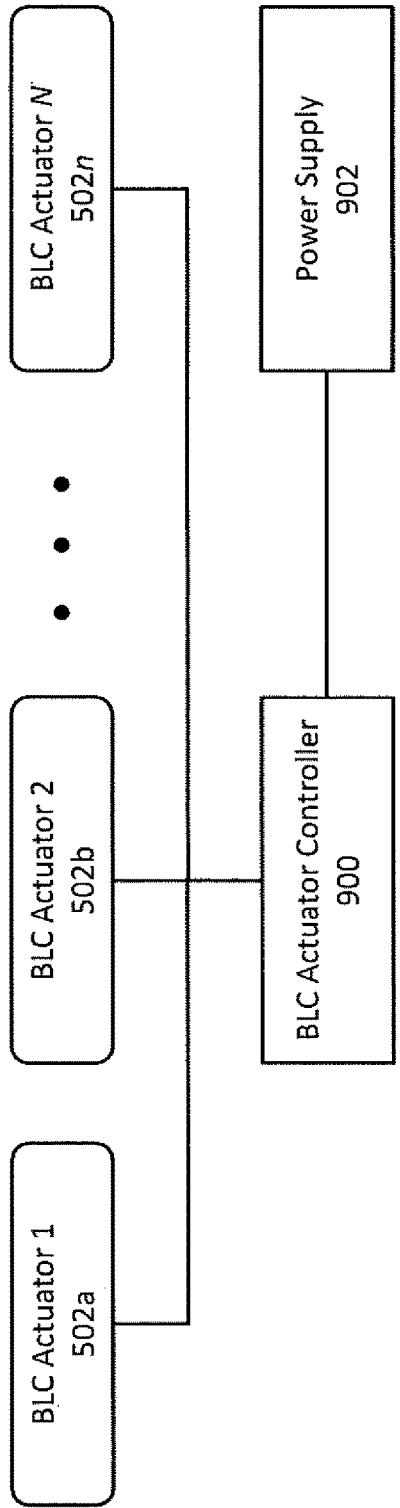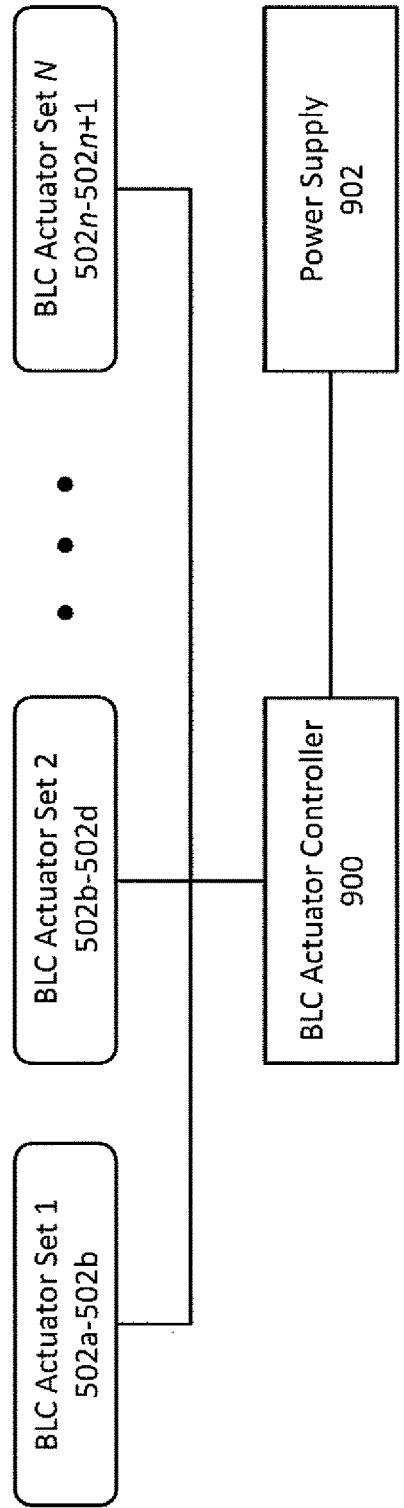

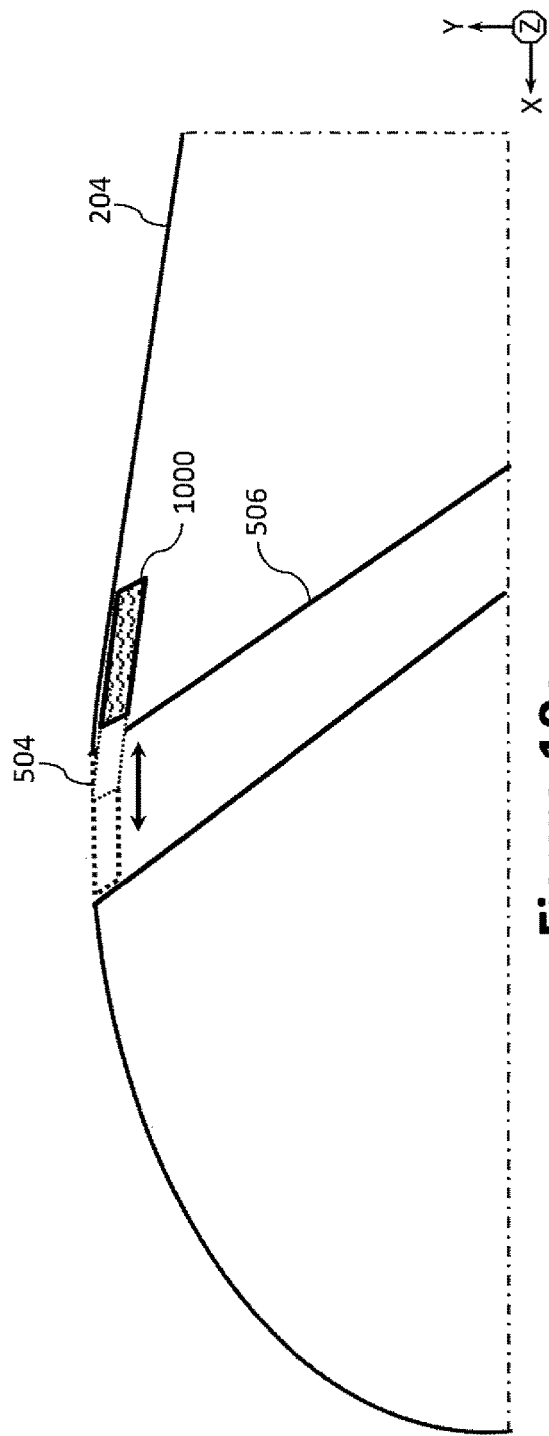
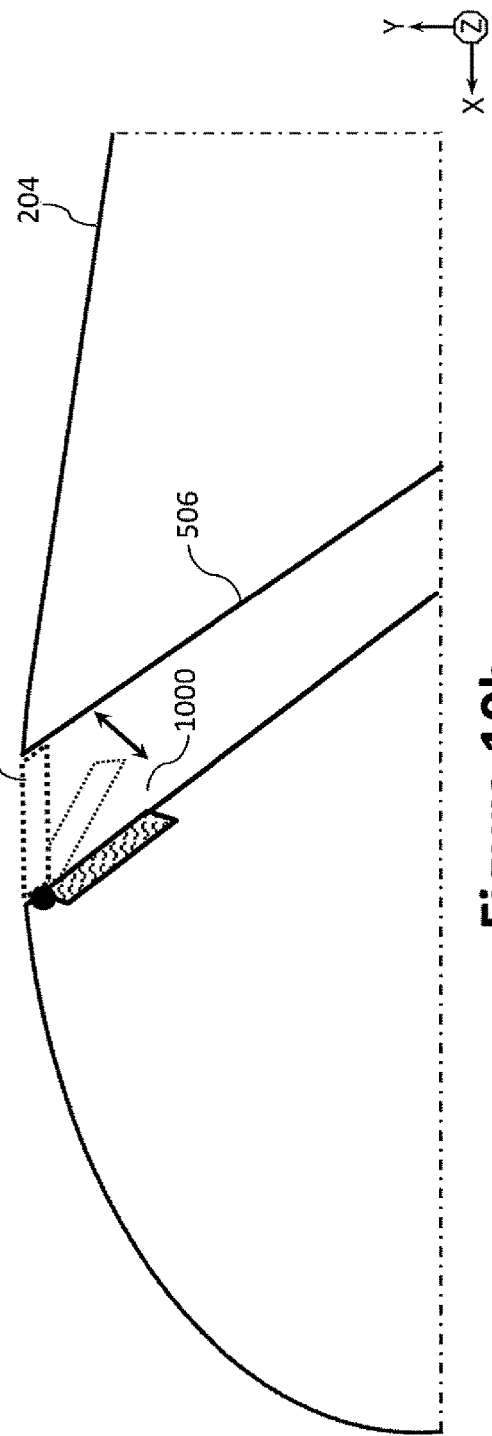

BOUNDARY LAYER CONTROL SYSTEM AND DEVICE

TECHNICAL FIELD

The present disclosure relates to systems and methods to provide boundary layer control; more particularly, to boundary layer control devices for aircraft and marine craft.

BACKGROUND

Aircraft sometimes employ devices to increase lift during flight. Lift is a component of force exerted on an object by a flowing fluid (e.g., air or water) that is perpendicular to the flow direction. Lift is often discussed with respect to a foil, such as an airfoil (e.g., an aircraft wing airfoil) or hydrofoil (e.g., a watercraft hydroplane), or a complete foil-bearing body. Lift is proportional to the density of the fluid, the velocity of the object, and certain properties of the foil, such as its surface area. Lift is also proportional to a lift coefficient (CL), which is a numerical representation of dynamic lift characteristics of the foil. To achieve forward flight, for example, a fixed wing aircraft must generate a certain amount of lift.

Generating lift can be a challenge at slower speeds. All things being equal, the slower an object travels, the less lift that is generated; therefore, a direct relationship existing between speed and lift. This can be an issue when an aircraft is traveling at reduced speeds, such as during take-off and landing. This issue may be compounded in situations where the length or distance of a take-off or landing is reduced, such as on an aircraft carrier or short runway. While it is possible in some situations to increase lift by increasing the surface area of the foil, there are also disadvantageous tradeoffs, such as increased weight and increased drag. Thus, designers have studied ways to increase the lift coefficient to generate more lift at slower speeds while keeping the wing size relatively small. For example, certain boundary layer control (BLC) schemes have been employed to delay boundary layer separation, thereby allowing a higher angle-of-attack and maximizing lift potential (and lift coefficient). Existing BLC schemes are not practical, nor are they economical.

In view of the foregoing, a need exists for an improved systems and methods for providing boundary layer control. For example, a need exist for practical and economical boundary layer control devices for embedment in the airfoil of air and marine craft.

SUMMARY

The present disclosure is directed to systems and methods to provide boundary layer control; more particularly, to boundary layer control devices for embedment in the airfoil of aircraft and marine craft.

According to a first aspect, a boundary layer control (BLC) system for a flight surface (the flight surface having a top surface, a bottom surface, a leading edge, and a trailing edge) comprises: an actuator having a crossflow fan and a motor to drive the crossflow fan about an axis of rotation, wherein the actuator is embedded within the flight surface and adjacent the leading edge, wherein the actuator is configured to output local airflow via an outlet channel through an outlet aperture adjacent the top surface to energize a boundary layer of air adjacent the top surface of the flight surface.

In certain aspects, the actuator is configured to ingest the local airflow via an inlet channel through an inlet aperture on the bottom surface.

In certain aspects, the inlet aperture is positioned on the bottom surface to coincide with a stagnation point.

In certain aspects, the flight surface includes at least one movable door configured to close the inlet aperture and the outlet aperture.

In certain aspects, the flight surface includes a slat that is movable between an extended position and a retracted position, wherein the slat defines a leading edge slot in the extended position.

In certain aspects, the outlet aperture is positioned on the leading edge and within the leading edge slot.

In certain aspects, the slat is configured to block the outlet aperture when in the retracted position.

In certain aspects, the actuator is positioned forward of a front spar of the flight surface.

In certain aspects, the axis of rotation is parallel to a portion of the leading edge adjacent the actuator.

In certain aspects, the actuator is battery powered.

In certain aspects, the actuator is generator powered.

In certain aspects, wherein part of the energy expended to drive the actuator is recovered as vectored thrust in the exhaust.

In certain aspects, the BLC system further comprises a second actuator having a second crossflow fan and a second electric motor to drive the second crossflow fan about a second axis of rotation, wherein the second actuator is embedded within the flight surface and adjacent the trailing edge to output local airflow over a knee of a flap coupled at the trailing edge to energize a boundary layer of air adjacent a surface of the flap.

In certain aspects, the second actuator is positioned aft of a rear spar of the flight surface.

In certain aspects, the second axis of rotation is parallel to a portion of the trailing edge adjacent the second actuator.

In certain aspects, the BLC system further comprises a second actuator having a second crossflow fan and a second electric motor to drive the second crossflow fan about a second axis of rotation, wherein the second actuator is configured for embedment within the flight surface and adjacent the trailing edge to output local airflow over a surface of an elevator or a rudder coupled to the trailing edge to energize a boundary layer of air adjacent the surface of the elevator of the rudder.

According to a second aspect, an aircraft having boundary layer control, the aircraft comprises: a fuselage; a wing operatively coupled to the fuselage, wherein the wing includes a top surface, a bottom surface, a leading edge, and a trailing edge; and an actuator having a crossflow fan and a motor to drive the crossflow fan about an axis of rotation, wherein the actuator is embedded within the fixed wing and adjacent the leading edge, wherein the actuator is configured to output local airflow via an outlet channel through an outlet aperture adjacent the top surface to energize a boundary layer of air adjacent the top surface of the fixed wing.

In certain aspects, the actuator is configured to ingest the local airflow via an inlet channel through an inlet aperture on the bottom surface.

In certain aspects, the inlet aperture is positioned on the bottom surface to coincide with a stagnation point.

In certain aspects, the fixed wing includes at least one movable door configured to close the inlet aperture and the outlet aperture.

In certain aspects, the fixed wing includes a slat that is movable between an extended position and a retracted position, wherein the slat defines a leading edge slot in the extended position.

In certain aspects, the outlet aperture is positioned on the leading edge and within the leading edge slot.

In certain aspects, the slat is configured to block the outlet aperture when in the retracted position.

In certain aspects, the actuator is positioned forward of a front spar of the fixed wing.

In certain aspects, the axis of rotation is parallel to a portion of the leading edge adjacent the actuator.

In certain aspects, the actuator is battery powered.

In certain aspects, the actuator is generator powered.

In certain aspects, part of the energy expended to drive the actuator is recovered as vectored thrust in the exhaust.

In certain aspects, the aircraft further comprises a second actuator having a second crossflow fan and a second electric motor to drive the second crossflow fan about a second axis of rotation, wherein the second actuator is embedded within the fixed wing and adjacent the trailing edge to output local airflow over a knee of a flap coupled at the trailing edge to energize a boundary layer of air adjacent a surface of the flap.

In certain aspects, the second actuator is positioned aft of a rear spar of the fixed wing.

In certain aspects, the second axis of rotation is parallel to a portion of the trailing edge adjacent the second actuator.

In certain aspects, the aircraft further comprises a second actuator having a second crossflow fan and a second electric motor to drive the second crossflow fan about a second axis of rotation, wherein the second actuator is embedded within the fixed wing and adjacent the trailing edge to output local airflow over a surface of an elevator or a rudder coupled to the trailing edge to energize a boundary layer of air adjacent the surface of the elevator of the rudder.

According to a third aspect, an aircraft wing comprises: an upper wing surface and a lower wing surface, wherein the upper wing surface and lower wing surface merge into a leading edge and a trailing edge; an actuator having a crossflow fan and a motor to drive the crossflow fan about an axis of rotation, wherein the actuator is embedded between the upper wing surface and the lower wing surface and adjacent the leading edge, wherein the actuator is configured to blow local airflow through an outlet aperture of the leading edge to energize a boundary layer air adjacent the aircraft wing.

In certain aspects, the actuator is configured to ingest the local airflow via an inlet channel through an inlet aperture on the bottom surface.

In certain aspects, the inlet aperture is positioned on the bottom surface to coincide with a stagnation point.

In certain aspects, the fixed wing includes at least one movable door configured to close the inlet aperture and the outlet aperture.

In certain aspects, the fixed wing includes a slat that is movable between an extended position and a retracted position, wherein the slat defines a leading edge slot in the extended position.

In certain aspects, the crossflow fan is operated as a function of sensor data from at least one sensor that reflects one or more flow conditions about the aircraft wing.

In certain aspects, the outlet aperture is positioned on the leading edge and within the leading edge slot.

In certain aspects, the slat is configured to block the outlet aperture when in the retracted position.

In certain aspects, the actuator is positioned forward of a front spar of the fixed wing.

In certain aspects, the axis of rotation is parallel to a portion of the leading edge adjacent the actuator.

In certain aspects, the actuator is battery powered.

In certain aspects, the actuator is generator powered.

In certain aspects, part of the energy expended to drive the actuator is recovered as vectored thrust in the exhaust.

In certain aspects, the aircraft wing further comprises a second actuator having a second crossflow fan and a second electric motor to drive the second crossflow fan about a second axis of rotation, wherein the second actuator is embedded between the upper wing surface and the lower wing surface and adjacent the trailing edge to output local airflow over a knee of a flap coupled at the trailing edge to energize a boundary layer of air adjacent a surface of the flap.

In certain aspects, the second actuator is positioned aft of a rear spar of the fixed wing.

In certain aspects, the second axis of rotation is parallel to a portion of the trailing edge adjacent the second actuator.

In certain aspects, the aircraft wing further comprises a second actuator having a second crossflow fan and a second electric motor to drive the second crossflow fan about a second axis of rotation, wherein the second actuator is embedded between the upper wing surface and the lower wing surface and adjacent the trailing edge to output local airflow over a surface of a control surface coupled to the trailing edge to energize a boundary layer of air adjacent the surface of the elevator of the rudder.

According to a fourth aspect, a boundary layer control (BLC) system for a fixed wing aircraft comprises: a first plurality of fans mounted within a wing, forward of a front spar of the wing, wherein an axis of each of the first plurality of fans is aligned in a span-wise direction, and wherein the first plurality of fans are configured to output local airflow through at least one leading edge slot of the wing to energize a boundary layer air adjacent the surface of the wing; and a second plurality of fans mounted within the wing, aft of a rear spar of the wing, wherein an axis of each of the second plurality of fans is aligned in a span-wise direction, and wherein the second plurality of fans are configured to output local airflow over at least one knee of at least one flap of the wing to energize a boundary layer air adjacent the surface of the wing.

According to a fifth aspect, an aircraft comprises: a fuselage; a wing operatively coupled to the fuselage, wherein the wing includes an upper surface and a lower surface, wherein the upper surface and lower surface merge into a leading edge and a trailing edge, and wherein the leading edge includes a slot; and a fan embedded in the wing, wherein the fan is configured to output local airflow through the slot of the wing to energize a boundary layer of air adjacent the surface of the wing.

DESCRIPTION OF THE DRAWINGS

These and other advantages of the present invention may be readily understood with the reference to the following specifications and attached drawings wherein:

FIG. 1b illustrates boundary level separation with respect to the example airfoil of FIG. 1a.

FIG. 3a illustrates a cross section of a wing of an example fixed-wing aircraft.

FIG. 3b illustrates a wing airfoil of an example aircraft with an extended slat and an extended flap.

FIG. 5 illustrates a top plan view of the aircraft of FIG. 2 having a plurality of BLC actuators positioned along the leading and/or trailing edges of the flight surface.

FIGS. 6a through 6d illustrate an example wing airfoil cross section along line 5-5 of FIG. 5.

FIG. 9a illustrates a block diagram of an actuator control system according to an aspect of the disclosure.

FIG. 9b illustrates a block diagram of an actuator control system according to an alternative aspect of the disclosure.

FIG. 10a illustrates a channel and/or aperture closure device according to one aspect.

FIG. 10b illustrates a channel and/or aperture closure device according to another aspect.

DETAILED DESCRIPTION

Figure 1A:
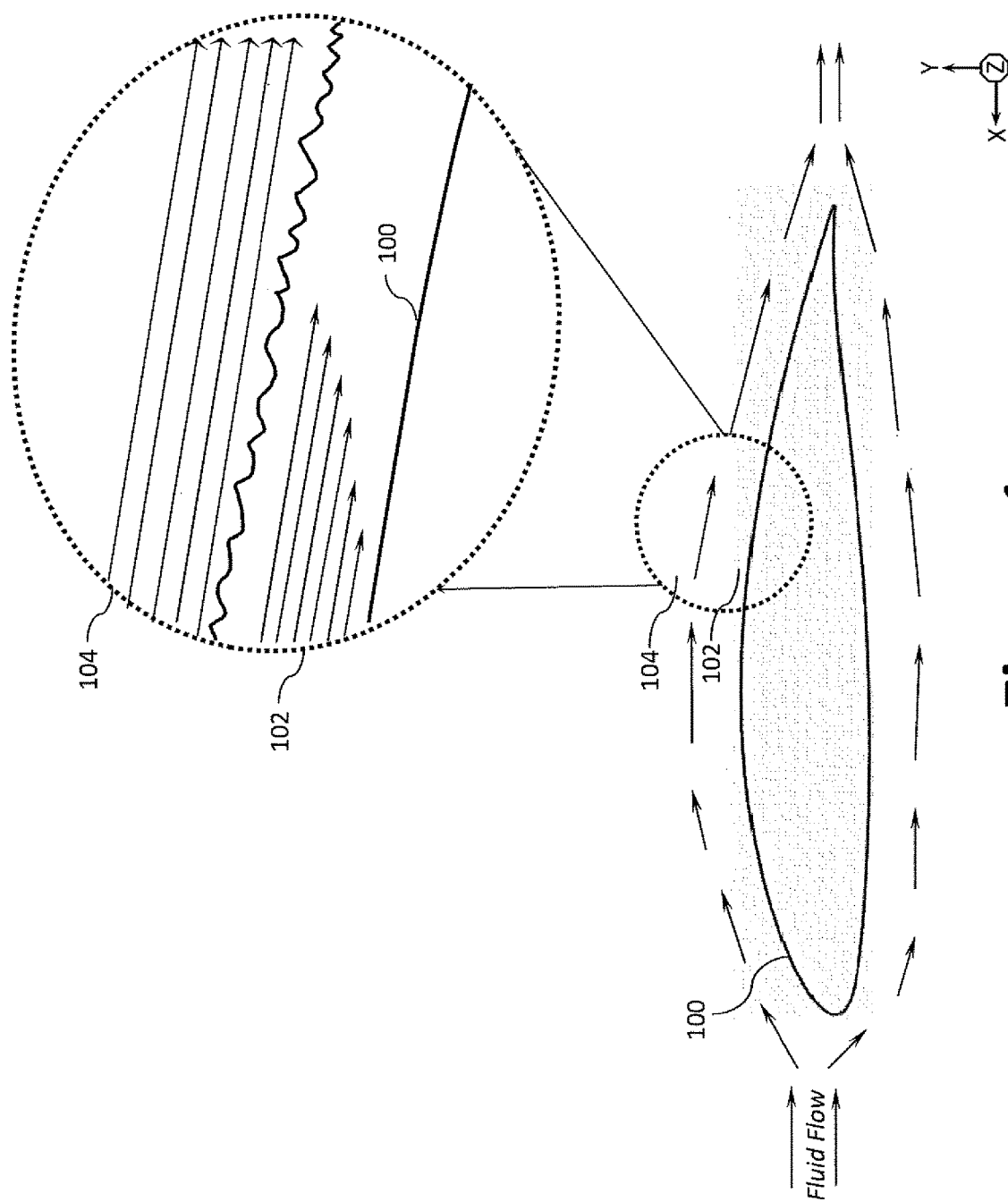
FIG. 1a illustrates laminar flow over an example airfoil.

Preferred embodiments of the present disclosure and other objects, features, and advantages of the devices, systems, and methods described herein will be apparent from the following description of particular embodiments thereof, as illustrated in the accompanying figures, where like reference numbers refer to like or similar structures. The figures are not necessarily to scale, emphasis instead is being placed upon illustrating the principles of the devices, systems, and methods described herein. In the following description, well-known functions or constructions are not described in detail because they may obscure the disclosure in unnecessary detail. For this disclosure, the following terms and definitions shall apply.

The term "and/or" means any one or more of the items in the list joined by "and/or". As an example, "x and/or y" means any element of the three-element set {(x), (y), (x,y)}. In other words, "x and/or y" means "one or both of x and y". As another example, "x, y, and/or z" means any element of the seven-element set {(x), (y), (z), (x,y), (x,z), (y,z), (x,y, z)}. In other words, "x, y and/or z" means "one or more of x, y and z".

The term "aircraft" refers to a machine capable of flight, including, but not limited to, traditional aircraft, unmanned aerial vehicles (UAVs), drones, and vertical take-off and landing (VTOL) aircraft.

The term "composite material" refers to a material comprising an additive material and a matrix material. For example, a composite material may comprise a fibrous additive material (e.g., fiberglass, glass fiber ("GF"), carbon fiber ("CF"), aramid/para-aramid synthetic fibers, FML, etc.) and a matrix material (e.g., epoxies, polyimides, aluminum, titanium, and alumina, including, without limitation, plastic resin, polyester resin, polycarbonate resin, casting resin, polymer resin, thermoplastic, acrylic resin, chemical resin, and dry resin). Further, composite materials may comprise specific fibers embedded in the matrix material, while hybrid composite materials may be achieved via the addition of some complementary materials (e.g., two or more fiber materials) to the basic fiber/epoxy matrix.

The term "coupled" means attached, affixed, connected, joined, fastened, linked, and/or otherwise secured.

The term "exemplary" means serving as a non-limiting example, instance, or illustration. As utilized herein, the terms "e.g.," and "for example" set off lists of one or more non-limiting examples, instances, or illustrations.

The term "fluid," when used as a noun, refers to a free-flowing deformable substance with no fixed shape, including, inter alia, gas (e.g., air, atmosphere, etc.), liquid (e.g., water), and plasma.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "marine craft" refers to a machine capable of operation in water, including, inter alia, vessels capable of operation on top of the water (e.g., boats) and under water (e.g., submarines).

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is a boundary layer control (BLC) system and device to introduce accelerated local and/or ambient fluid from one side of a foil to a boundary layer of a foil (e.g., an airfoil or hydrofoil). The BLC system thus accelerates, energizes, and/or otherwise modifies boundary layer fluid up to and/or past the speed of the free stream in order to delay separation of the boundary layer over the surface of the airfoil or hydrofoil. This delayed separation makes it possible to extend the usable range of angle-of-attack and consequently raises the maximum lift coefficient, thereby allowing for steeper alterations of altitude at reduced speeds without stalling. This increased lift may be especially useful during low speed flight and short take-off and landing (STOL) situations.

In terms of aircraft, a maximum lift coefficient is produced at a critical angle-of-attack. The angle-of-attack is the angle between a reference line of the moving object (e.g., a line defined by the longitudinal length of the fuselage) and a vector representing the relative motion of gas or fluid surrounding the aircraft. As the angle-of-attack increases, the coefficient of lift increases, until the point at which the critical angle-of-attack is reached. As the angle-of-attack increases past the critical angle-of-attack, the flow of air begins to flow less smoothly over the upper surface of the airfoil, and then begins to separate from the upper surface of the airfoil. At the critical angle-of-attack, separated flow can become so dominant that additional increases in the angle-of-attack produce less lift and more drag. Above the critical angle-of-attack, the aircraft is said to be in a stall condition. A stalled aircraft can be dangerous and difficult to control.

Figure 1B:
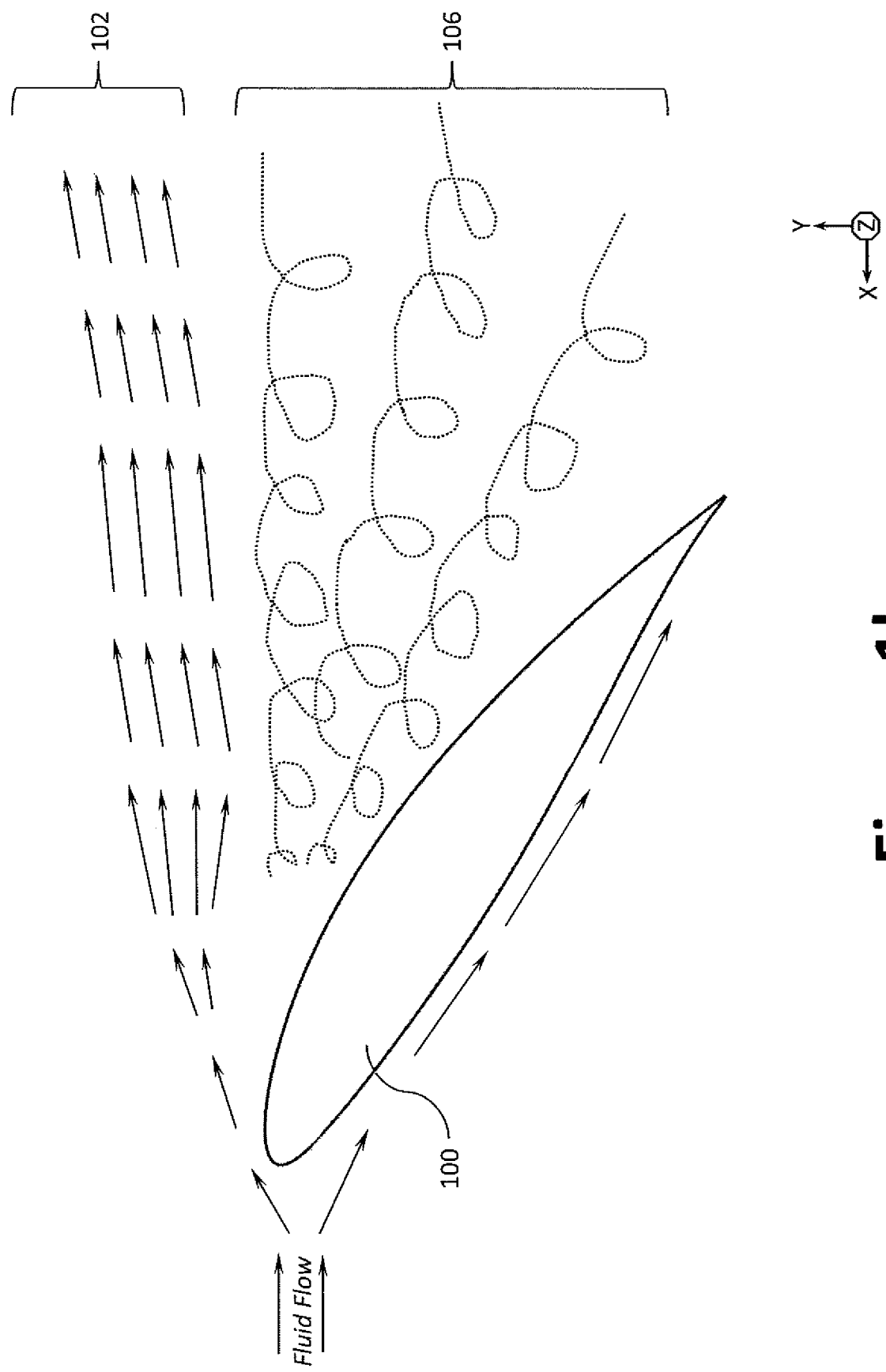

The flow of air adjacent the upper surface of an airfoil that separates during stall is called the boundary layer. FIG. 1a illustrates a boundary layer 102 flowing over an airfoil 100. Boundary layer air is sometimes characterized as viscous because it tends to stick to the airfoil 100, thus making it slower than the free stream air 104 outside the boundary layer. Boundary layer separation occurs when the speed of the boundary layer 102 relative to the airfoil 100 falls to almost zero. FIG. 1b illustrates boundary layer separation. At the point of boundary layer separation, the fluid flow becomes detached from the surface of the airfoil 100 and creates a turbulent wake 106. It can be difficult to maintain lift after boundary layer separation occurs, and the risk of stalling may also increase.

Boundary layer control (BLC) systems, which may be either passive or active, can be employed to delay boundary layer separation; thereby allowing a higher angle-of-attack and maximizing lift potential (and lift coefficient). Leading edge devices (e.g., slats) and trailing edge devices (e.g., flaps) are an example form of passive BLC systems. Active BLC systems generally provide superior lift compared to passive methods by delaying separation of the boundary layer over the top surface of an airfoil using powered systems. Active BLC schemes can involve, inter alia, suction or tapping compressor air from a gas turbine engine to supply bleed air to blow the flaps. Both suction and tapping methods, however, incur significant weight penalties and practical hurdles. For example, boundary layer suction requires thousands of micro-sized holes drilled on the surface of the airfoil. These micro-sized holes are prone to icing and clogging under normal operational conditions. Likewise, boundary layer blowing via bleed air involves ducting high-pressure air from the engine to other parts of the aircraft. Traditional blowing may require substantial heavy ducting because of the extremely elevated bleed air temperatures, as well as the amount of aircraft surface area involved. The ducting may also interfere with the structural layout of the aircraft and limit the mass flow that is available. Additionally, it may deprive the engine of thrust and is dependent upon the engine for thrust. Further, significant pressure losses are associated with the many bends in the ducts required to bring the air from the engines to the BLC nozzles.

Rather than piping air from a distant engine, one or more BLC actuators (e.g., fans driven by electric motors) may be embedded, or otherwise located in, the wing itself to drive air from the local airflow through a leading edge slot (or over the knee of a flap) and to the boundary layer. The size and shape of the BLC actuators may be selected to avoid interference with the wing structure and systems. Because the BLC actuators are separate from the aircraft engine, the revolutions per minute (RPM) of the BLC actuators would not be tied to engine throttle and, therefore, may be separately and independently controlled.

Figure 2:
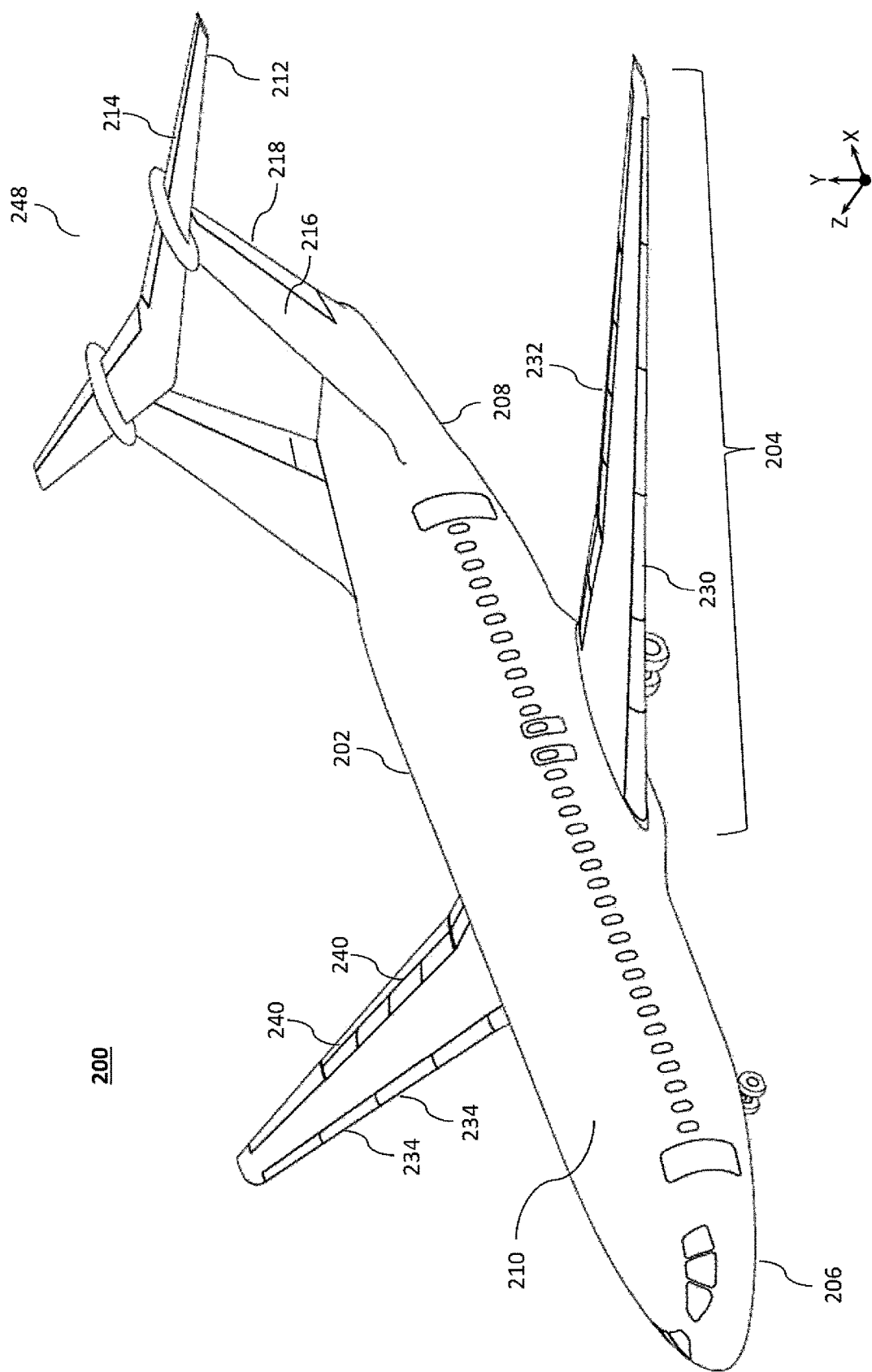
FIG. 2 illustrates an isometric view of an example fixed-wing aircraft.

FIG. 2 illustrates an example aircraft 200 according to an aspect of the present disclosure. As illustrated, the aircraft 200 may generally comprise a fuselage 202, a pair of wings 204 (illustrated as fixed-wings) operatively coupled to the fuselage 202, and a tail (or empennage) 248 operatively coupled to the fuselage 202 at its aft end. The fuselage 202, as illustrated, includes a nose (or forward) portion 206 and a rear (or aft) 208 portion. The internal components of the aircraft 200 are generally covered, concealed, and/or shielded by an external aircraft skin (and/or shell) 210, which may be fabricated from a substantially solid aerodynamic material. For example, the aircraft skin 210 may comprise a metal material, such as, but not limited to, aluminum, titanium, steel, or alloys thereof. Alternatively, or additionally, the aircraft skin 210 may be constructed using composite material such as, but not limited to, fiberglass. As a further alternative, the aircraft skin 210 may be a blend of multiple materials.

The wings 204 serve to produce lift and act as an airfoil during flight. As illustrated in FIG. 3a, the wings 204 may have internal structural supports. In the example embodiment illustrated in the figures, the wings 204 include a forward spar 220, a central spar 222 (e.g., a main spar), and a rear (aft) spar 224. Each wing 204 is covered with aircraft skin 210 to define an upper (top) surface 226 and a bottom (lower) surface 228. The upper surface 226 and bottom surface 228 connect and/or merge at (or near—depending on the airfoil shape) a leading edge 230 and a trailing edge 232 of the wing 204. The internal structural supports of the wing 204 may be fabricated using a metal, metal alloy, a composite material (or laminate thereof), or combination thereof. For example, a wing 204 may be fabricated using composite materials through co-curing or composite components connected using metal fittings (e.g., aluminum, titanium, lightweight alloys, etc.).

As illustrated in FIGS. 3b and 3c, one or more slats 234 may be slideably mounted along the leading edge 230 of the wing 204 to allow the aircraft 200 to operate at a higher angle-of-attack and produce a larger lift coefficient during flight. The slats 234 may be positioned forward from the leading edge 230 of the wing 204 and configured to slide along the x-axis away from and relative to the leading edge 230 (as indicated by the arrow), thereby defining a leading edge (or space) 236 between the slat 234 and the leading edge 230 through which fluid may flow. Alternatively, or additionally, the slat 234 may be positioned at an elevated and/or raised position such that the top portion of the slat 234 is raised above the upper surface 226 of the wing 204, or at a drooping and/or lowered position where the bottom surface of the slat 234 is beneath the bottom surface 228 of the wing. Alternatively, or additionally, the slat 234 may be positioned both forward and upward, both forward and downward, or a movable therebetween.

At least one slat support mechanism 238 is provided to connect the slat 234 to the wing's 204 frame (e.g., a rib or spar) to allow the slat 234 to extend forward and/or to retract backward. In certain aspects, the slat 234 may be substantially fixed in place and permanently extended away from the leading edge 230 of the wing 204. Alternatively, the slat 234 may be movable between an extended position where the slat 234 extends away from the wing 204, and a retracted position where the slat 234 is flush with the wing 204, thereby creating a continuous surface with the rest of the wing 204 and effectively closing and/or shutting the leading edge slot 236. When movable, the position and movement of the slat 234 via the slat support mechanism(s) 238 may be controlled by a pilot (or another operator) through an electronic or a hydraulic system of the aircraft 200, and/or may be configured to automatically respond to aerodynamic forces during flight (e.g., under the control of a flight control system or autopilot).

The aircraft 200 may further include one or several flaps 240 along the trailing edge 232 of the wing 204 to assist in producing a larger lift coefficient during flight. As illustrated in FIGS. 3a and 3b, the flaps 240 may be rotatably and/or hingedly connected to the wing 204 such that the flaps 240 may pivot up or down relative to the wing 204 during flight. The flaps 240 may be configured to rotate about a knee, hinge portion, or joint 242. The flaps 240 may additionally be configured with a mechanism to allow for other, non-rotatable movement, such as, for example, sliding laterally or horizontally. For example, the flaps 240 may configured as slotted flaps to extend laterally away from the wing 204 before rotating, thereby creating a trailing edge slot 244 between the flap 240 and the wing 204. When extended away from the wing 204, the flaps 240 may be supported by at least one flap support mechanism 246. The flaps 240 may be any suitable type known to those of ordinary skill in the art, including, inter alia, normal or plain single element flaps, split flaps, slotted flaps, Fowler flaps, double slotted flaps, triple slotted flaps, Junkers flaps, Gouge flaps, Fairey-Youngman flaps, Zap flaps, and/or Gurney flaps. In some embodiments, the flaps 240 may be combined with, or replaced by, ailerons or flaperons. The position and movement of the flaps 240 may be controllable by a pilot or operator and/or automated by an electronic, computer, and/or hydraulic system of the aircraft 200, and/or may be configured to automatically respond to aerodynamic forces during flight. Persons of ordinary skill in the art will recognize that alternative and/or additional structural arrangements may be implemented to accommodate the design and/or operational requirements of the aircraft 200.

The aircraft 200 may further include a tail 248 to, inter alia, produce lift and act as an airfoil during flight. As illustrated in FIG. 2, the tail 248 may comprise a set of vertical stabilizers 216 (e.g., dorsal fins) extending vertically from the fuselage 202, a rudder 218 operatively coupled to the vertical stabilizer 216, a horizontal stabilizer 212 supported by the set of vertical stabilizers 216 to extend laterally from either side of the fuselage 202, and elevators 214 operatively coupled to the horizontal stabilizer 212. Depending on the desired tail configuration, the horizontal stabilizer 212 and vertical stabilizers 216 may be operatively coupled to one another as well as the fuselage 202, or operatively coupled only to the fuselage 202. A rudder 218 may be rotatably and/or hingedly coupled to each vertical stabilizer 216 to enable the rudder 218 to move about an axis defined by the vertical stabilizer 216 at its trailing edge. The rudder 218 may additionally be configured with a mechanism to allow for other, non-rotatable movement, such as, for example, sliding and/or lateral movement. In alternative embodiments, the rudder 218 may be coupled to the vertical stabilizer 216 in such a way as to be substantially fixed in place. In a further alternative, the rudder 218 may be omitted entirely.

Figure 4A:
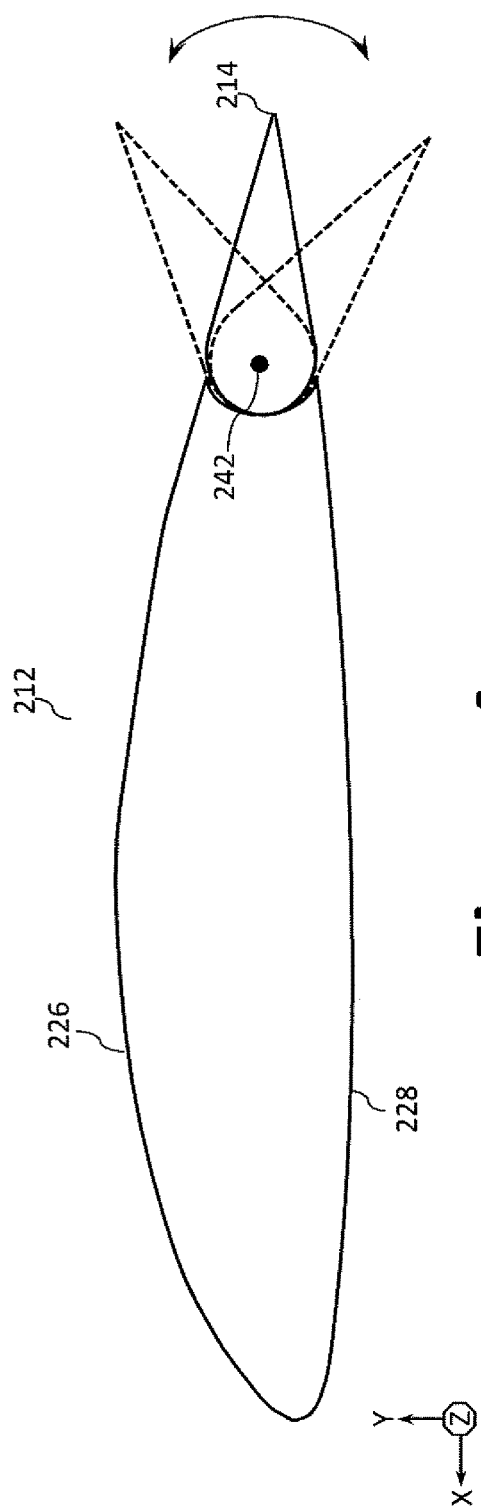
FIG. 4a illustrates a cross section of a horizontal stabilizer airfoil of an example fixed-wing aircraft.
Figure 4B:
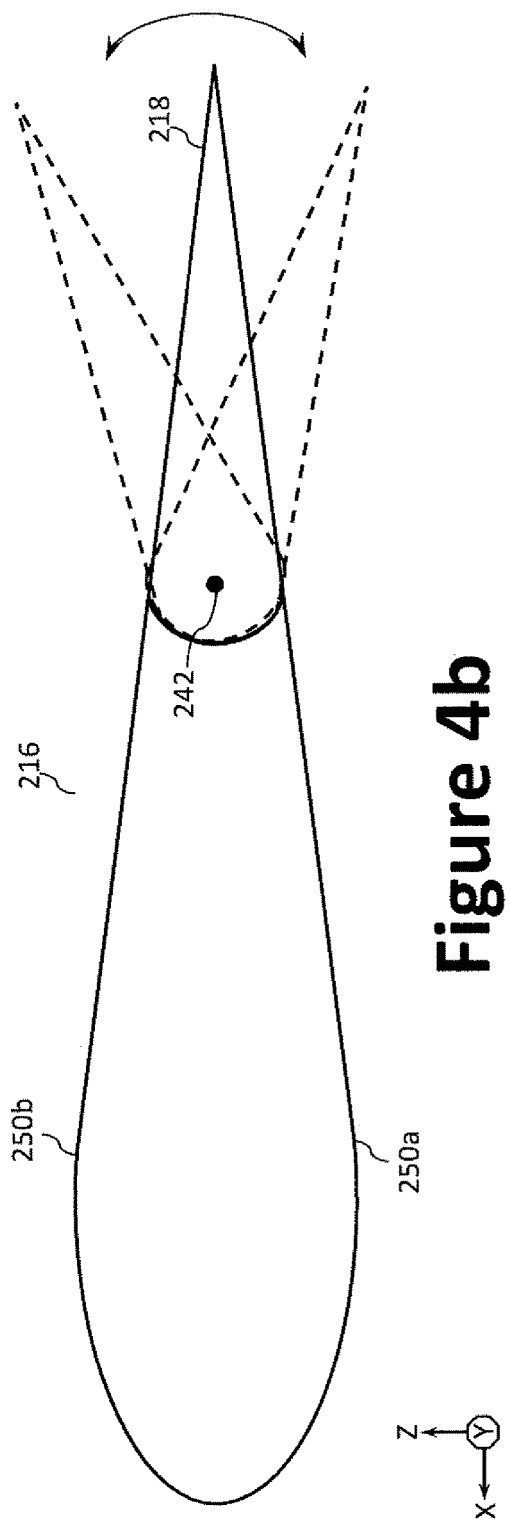
FIG. 4b illustrates a cross section of a vertical stabilizer airfoil of an example fixed-wing aircraft.

As illustrated in FIG. 4a, the elevators 214 may be rotatably and/or hingedly coupled to the horizontal stabilizer 212 to enable movement about an axis defined by the horizontal stabilizer 212 at its trailing edge. The elevators 214 may additionally be configured with a mechanism to allow for other, non-rotatable movement, such as, for example, sliding and/or lateral movement. In alternative embodiments, the elevators 214 may be coupled to the horizontal stabilizer 212 in such a way as to be substantially fixed in place. In a further alternative, the elevators 214 may be omitted entirely. In those embodiments where the rudder 218 and elevators 214 exist and are movable, the position and movement of the rudder 218 and elevators 214 may be controllable by a pilot or operator, automated by an electronic, computer, and/or hydraulic system of the aircraft 200, and/or may be configured to automatically respond to aerodynamic forces during flight.

The tail 248 may be configured in one of multiple tail configurations, including, for example, fuselage mounted, a cruciform, T-tail, a flying tailplane, or, as illustrated in FIGS. 2 and 5, a pi-tail (i.e., π-tail). Therefore, persons of ordinary skill in the art will recognize that alternative and/or additional structural arrangements may be implemented to accommodate the design and/or operational requirements of the tail 248. For example, the tail 248 may instead employ only one vertical stabilizer 216 and one horizontal stabilizer 212, or several vertical stabilizers 216 and several horizontal stabilizers 212, and/or slanted or offset stabilizers that have both horizontal and vertical dimensions. Additionally, or alternatively, the tail 248 may include multiple rudders 218 and/or a plurality of elevators 214 on each horizontal stabilizer 212.

FIG. 5 illustrates a top plan view of the aircraft of FIG. 2 implementing a plurality of BLC actuators 502 positioned along the leading and/or trailing edges of the flight surfaces (e.g., the wings 204, horizontal stabilizer 212, and vertical stabilizers 216. More specifically, the aircraft 200 may be configured with one or more fluid moving BLC actuators 502 mounted within the wings 204 and/or tail 248. In the exemplary embodiments shown in FIGS. 5 through 7, the BLC actuators 502 may employ motor-driven blowers, which generally employ a motor and a fan, such as crossflow or tangential fans. The BLC actuators 502 are configured to blow, push, thrust, propel, and/or otherwise accelerate local or ambient fluid from a first surface of the airfoil to a second surface or skin 510 of the wings 204 and/or tail 248, which in turn energize, accelerate, and/or otherwise modify the boundary layer condition adjacent to the surfaces of the wings 204 and/or tail 248 to mitigate the risk of boundary layer separation. As noted above, mitigating boundary layer separation can extend the usable range of angle-of-attack and, consequently, increase the maximum lift coefficient ($C_{Lmax}$).

In certain aspects, a plurality of BLC actuators 502 may be mounted in each wing 204 to provide redundancy and complete coverage. This may be advantageous in a situation where a single BLC actuator 502 has failed, as there would still be several other BLC actuators 502 remaining operational. That is, by installing n number of BLC actuators 502 span-wise in the wing 204, the failure of a single BLC actuator 502 would only rob the wing 204 of roughly ($1/n^{th}$) of the total lift derived from the overall BLC system. The BLC actuators 502 may also be spaced apart span-wise (lengthwise) along the wing 204 to accommodate wing flexing. Each BLC actuators 502 may be mounted in the wings 204 (e.g., beneath the aircraft skin 210) with its axis of rotation 806 substantially aligned in a span-wise direction. The axis of rotation 806 of each BLC actuator 502 may further be aligned substantially parallel to the portion of the leading edges 230 and/or trailing edges 532 of the wings 204 that is adjacent the width BLC actuator 502 (e.g., along the Z-axis). The BLC actuators 502 may be mounted in close proximity to and/or substantially adjacent to the leading edge 230 (e.g., adjacent the slats 234) and trailing edge 232 (e.g., adjacent the flaps 240) of the wings 204. In certain aspects, each slat 234 may be matched with its own BLC actuators 502 and/or each flap 240 may be matched with its own BLC actuators 502. For example, each slat 234 and/or flap 240 may have a dedicated BLC actuator 502, which may be sized to be substantially the same width as the slat 234 and/or flap 240. Alternatively, multiple BLC actuators 502 may be placed adjacent each slat 234 and/or flap 240, or a single BLC actuator 502 may be used with multiple slats 234 and/or flaps 240. Alternatively, some slats 234 and/or flaps 240 may be matched with a single BLC actuator 502, while others are matched with multiple BLC actuators 502, while still others share a single BLC actuator 502. In some embodiments, some slats 234 and/or flaps 240 may not be matched with any BLC actuators 502.

Embedded BLC actuators 502 can achieve reductions in cost, weight, and/or improved performance. Taking a Boeing 737 for example, the rather extensive high-lift system comprising Krueger flaps and slats on the leading edge, double-slotted Fowler flaps on the trailing edge could be replaced with either plain or single-slotted Fowler flaps and the equivalent of slats, thereby resulting in a system that could delete many moving parts, and most of the flap track fairings which cause several percent points of the total drag in cruise. As a result, the Boeing 737's hydraulic system could also be made smaller, or entirely deleted in favor or electric actuators.

FIGS. 6a through 6d illustrate a cross section of a wing 204 airfoil taken along line 5-5 in FIG. 5, further depicting the operation of the BLC actuators 502. As illustrated, the wing 204 airfoil may define a set of chambers to house two BLC actuators 502a (leading) and 502b (trailing) (collectively, also referred to as 502). Leading BLC actuator 502a may be positioned aft of the leading edge 230 and forward (or ahead) of the forward spar 220. In one embodiment, as illustrated in FIG. 6d, the leading BLC actuator 502a may be positioned substantially adjacent to the leading edge slot 236 between the leading edge 230 of the wing 204 and the slat 234. The trailing BLC actuator 502b may be positioned aft of the rear spar 224 and forward of the trailing edge 232; substantially adjacent the flap 240 at the trailing edge 232 of the wing 204. One or more leading edge and trailing edge apertures 504 (e.g., strips, slits, slots, or holes) may be positioned on and/or near each of the upper surface 226 and/or bottom surface 228 of the wing 204.

Each aperture 504 may be in fluid communication with one or more fluid channels 506, which, in turn, may be in fluid communication with a BLC actuator 502. The apertures 504 at the bottom surface 228 of the wing 204 can serve as inlets to the BLC actuators 502, thereby allowing ambient or local fluid to enter the fluid channel 506 from the underside of the wing's 204 airfoil and to be acted upon (e.g., accelerated) by the BLC actuators 502. The apertures 504 at the upper surface 226 may serve as outlets from the BLC actuators 502, which allow the ambient or local fluid that entered through the inlets to be outputted from the BLC actuators 502 after being acted upon by BLC actuators 502. The aperture 504 at the bottom surface 228, the inlet aperture, of leading edge 230 of the wing 502 airfoil may be positioned to coincide with a stagnation point of the wing 204, thus taking advantage of the higher static pressure.

The fluid channels 506 may be curved, or otherwise shaped, along their length to better accommodate entry and exit of fluid flow between the BLC actuators 502 and the upper surface 226 and/or bottom surface 228. Alternatively, the fluid channels 506 may be straight, corkscrewed, looped, or otherwise shaped according to the desires and designs of the system or airfoil. The apertures 504 may remain substantially open during forward flight. Alternatively, one or more of the apertures 504 may be selectively opened and/or closed through movement of the slats 234 and/or flaps 240 (as shown in, for example, FIGS. 6c and 6d), through the use of doors or gates, and/or through alternative means. Specifically, FIG. 6c illustrates the wing 204 having the slat 234 and flap 240 in a retracted position (e.g., non-extended), while FIG. 6d illustrates the slat 234 and flap 240 in an extended position. As illustrated, each of the apertures 504 (top and bottom) on the leading edge 230 may be blocked (e.g., closed off and/or sealed) by the slat 234 when the slat 234 is retracted. Similarly, one aperture 504 (top) on the trailing edge 232 may be blocked by the flap 240, while the other aperture 504 (bottom) at the trailing edge 232 remain open/unobstructed. Further, one or more of the fluid channels 506 may be provided with a movable door 1000 to selective block/shut off (e.g., seal) the fluid channels 506 when not in use to improve airflow over the airfoil and to ensure that the airflow is directed from and to the correct apertures 504. The movable door 1000 may be provided in the channel 506 adjacent the upper or lower surface of the airfoil, adjacent the BLC actuator 502, or a movable door 1000 may be provided adjacent each of the BLC actuator 502 and the surface of the vertical stabilizer 216.

Figure 7A:
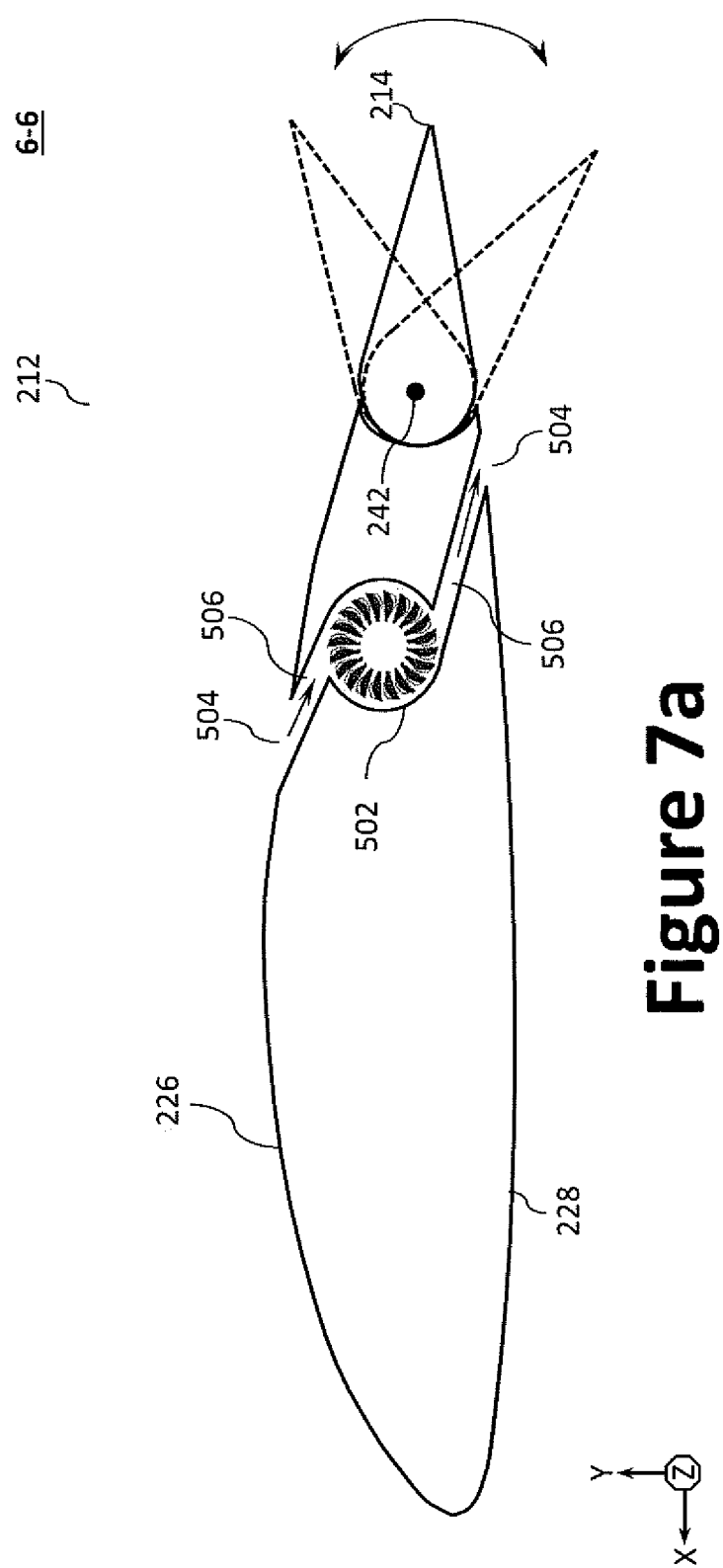
FIG. 7a illustrates an example horizontal stabilizer airfoil cross section along line 6-6 of FIG. 5.

FIG. 7a illustrates a cross section of an example horizontal stabilizer 212 airfoil cross section along line 6-6 in FIG. 5. Each horizontal stabilizer 212 may have a BLC actuator 502 positioned within the horizontal stabilizer 212 and positioned substantially adjacent the elevator 214. In alternative embodiments, a plurality of actuators may be positioned within the horizontal stabilizer 212, at least one of which may be substantially adjacent to the elevator 214. For example, like the wing 204, the horizontal stabilizer 212 may employ both leading and trailing BLC actuators 502. Each BLC actuator 502 may have an axis of rotation 806 that is aligned substantially parallel to a leading edge 230 and/or trailing edge 232 of the horizontal stabilizer 212. One or more apertures 504 may be positioned on and/or near the upper surface 226 of the horizontal stabilizer 212. The aperture 504 may be in fluid communication with a channel 506, which, in turn, may be in fluid communication with BLC actuator 502. Similarly, one or more apertures 504 may be positioned on and/or near the lower surface 228 of the horizontal stabilizer 212, which may be in fluid communication with a channel 506, which, in turn, may be in fluid communication with BLC actuator 502. The aperture 504 on and/or near the upper surface 226 may serve as an inlet to the BLC actuator 502, allowing ambient or local fluid to enter the channel 506 and be acted upon by the BLC actuator 502. The aperture 504 on and/or near the lower surface 528 may serve as an outlet to the BLC actuator 502, allowing the ambient or local fluid that entered through the inlet to be outputted after being acted upon by BLC actuator 502. As discussed above with the wing 204, the fluid channels 506 may be curved or otherwise shaped to better accommodate entry and exit of fluid flow. Alternatively, the fluid channels 506 may be straight, corkscrewed, looped, or otherwise shaped according to the desires and design of the system. The apertures 504 may remain substantially open most or all of the time during normal operation. Alternatively, some or all of the apertures 504 may be opened and/or closed through movement of the elevators 214 (e.g., the aperture may be blocked by the elevator when retracted), through the use of doors or gates, and/or through alternative means.

Figure 7B:
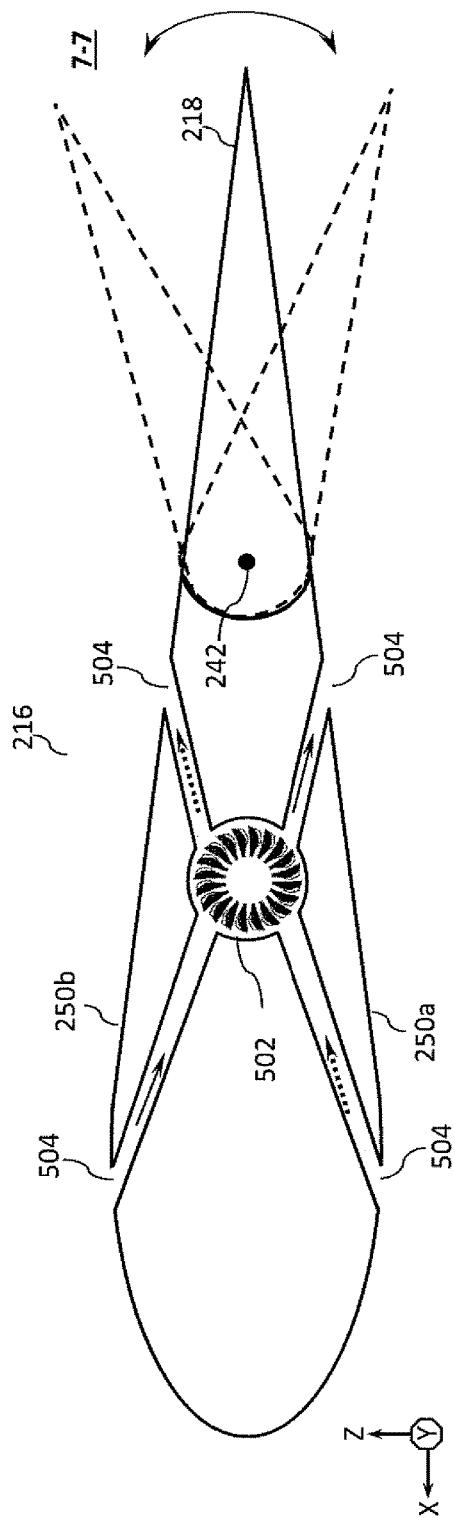
FIG. 7b illustrates an example vertical stabilizer airfoil cross section along line 7-7 of FIG. 5.
Figure 7C:
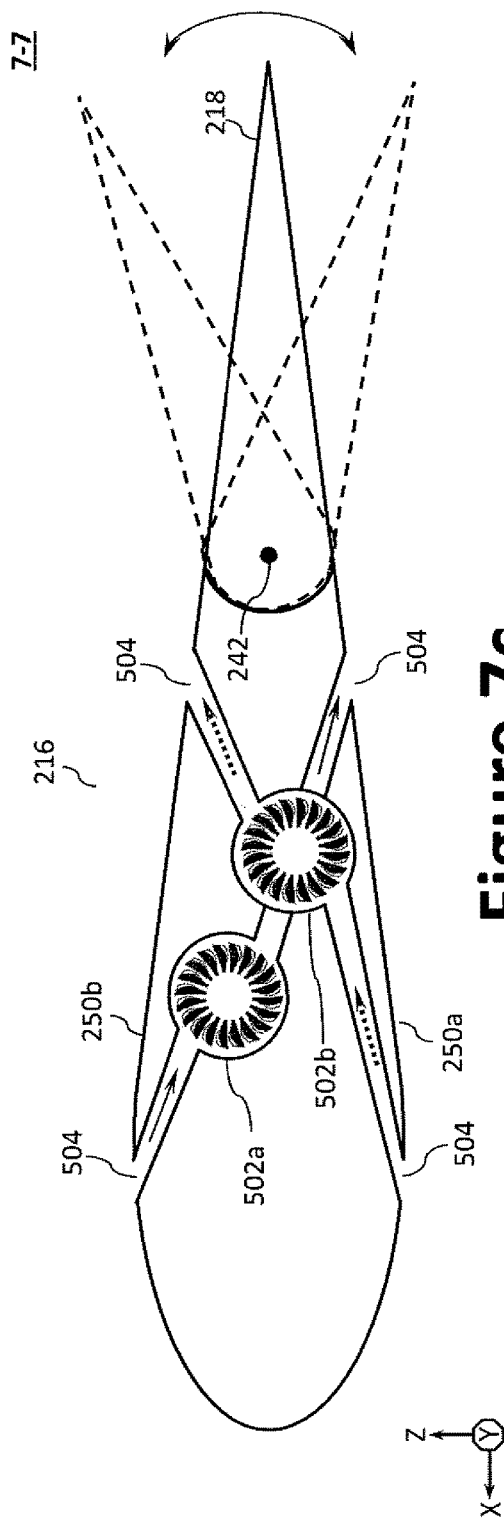
FIG. 7c illustrates an example vertical stabilizer airfoil cross section along line 7-7 of FIG. 5.

FIGS. 7b and 7c illustrates a cross section of an example vertical stabilizer 216 along the line 7-7 in FIG. 5. The vertical stabilizer 216 may have at least one BLC actuator 502 positioned within the stabilizer 216, in close proximity and/or substantially adjacent to the rudder 218. In an alternative embodiment, the vertical stabilizer 216 may have a plurality of BLC actuators 502 in close proximity and/or substantially adjacent to the rudder 218. The BLC actuators 502 may have an axis of rotation 806 aligned substantially parallel to a trailing edge 232 of the vertical stabilizer 216. At least one aperture 504 may be located on either side surface 250*a* (port), 250*b* (starboard) of the vertical stabilizer 216. The apertures 504 may be in fluid communication with channels 506, which, in turn, may be in fluid communication with BLC actuator 502.

As illustrated, each side surface 250*a*, 250*b* may have multiple apertures 504 in fluid communication with channels 506 and BLC actuator 502. In some embodiments, the BLC actuator 502 may be configured to use different channels 506 and/or apertures 504 depending on the desired direction of the aircraft 200 and the desired position, movement, and/or angle of the rudder 218. Alternatively, or additionally, the BLC actuator 502 may be configured to change its mode of operation (e.g., reverse its direction of fluid flow) depending on the desired direction of the aircraft 200 and the desired position, movement, and/or angle of the rudder 218. For example, the BLC actuator 502 may be embodied as a fan and be configured to change its direction and/or rate of spin or rotation depending on the direction of rudder 218 rotation, the desired direction of the aircraft 200, and/or the desired position, movement, and/or angle of the rudder 218.

Specifically, FIG. 7*b* illustrates an embodiment where a single BLC actuator 502 is coupled to four apertures 504 via four different channels 506. In operation, the BLC actuator 502 may changes it mode of operation to direct airflow from the starboard side surface 250*b* to the port side surface 250*a* (the airflow being show in solid arrows), or vice versa (the airflow being show in dotted arrows). To ensure that the airflow is directed from and to the correct apertures 504, each of the fluid channels 506 may be provided with a movable door 1000 to selective shut off (e.g., seal) the unused channels. The movable door 1000 may be provided in the channel 506 adjacent the surface of the vertical stabilizer 216, adjacent the actuator 502 (e.g., where the chamber housing the BLC actuator 502 couples to the channel 506), or a movable door 1000 may be provided adjacent each of the actuator 502 and the surface of the vertical stabilizer 216.

Alternatively, a plurality of BLC actuators 502 may be mounted in the vertical stabilizer 216, with some BLC actuators 502 configured to operate normally, while other BLC actuators 502 are configured to cease or change operation depending on the direction angle of rudder 218 rotation, the desired direction of the aircraft 200, and/or the desired position, movement, and/or angle of the rudder 218. Specifically, FIG. 7*c* illustrates an embodiment where two BLC actuators 502 are each separately coupled to two apertures 504 via two different channels 506. In operation, the two BLC actuators 502 may be independently and separately controlled to direct airflow from the starboard side surface 250*b* to the port side surface 250*a* (the airflow being show in solid arrows), or vice versa (the airflow being show in dotted arrows). As discussed with regard to FIG. 7*b*, one or more of the fluid channels 506 may be provided with a movable door 1000 to selective shut off (e.g., seal) the unused channels to ensure that the airflow is directed from and to the correct apertures 504.

As explained above, the fluid channels 506 may again be curved or rounded to better accommodate entry and exit of fluid flow (e.g., to prevent swirl of air flow). Alternatively, the fluid channels 506 may be straight, corkscrewed, looped, or otherwise shaped according to the desires and design of the system. The apertures 504 may remain substantially open most or all of the time during normal operation. Alternatively, the apertures 504 may be opened and/or closed through movement of the rudder 218, through the use of doors or gates, and/or through alternative means. As a further alternative, some of the apertures 504 may remain substantially open most or all of the time during normal operation while others may be opened and/or closed through movement of the rudder 218, and/or through alternative means.

Figure 8:
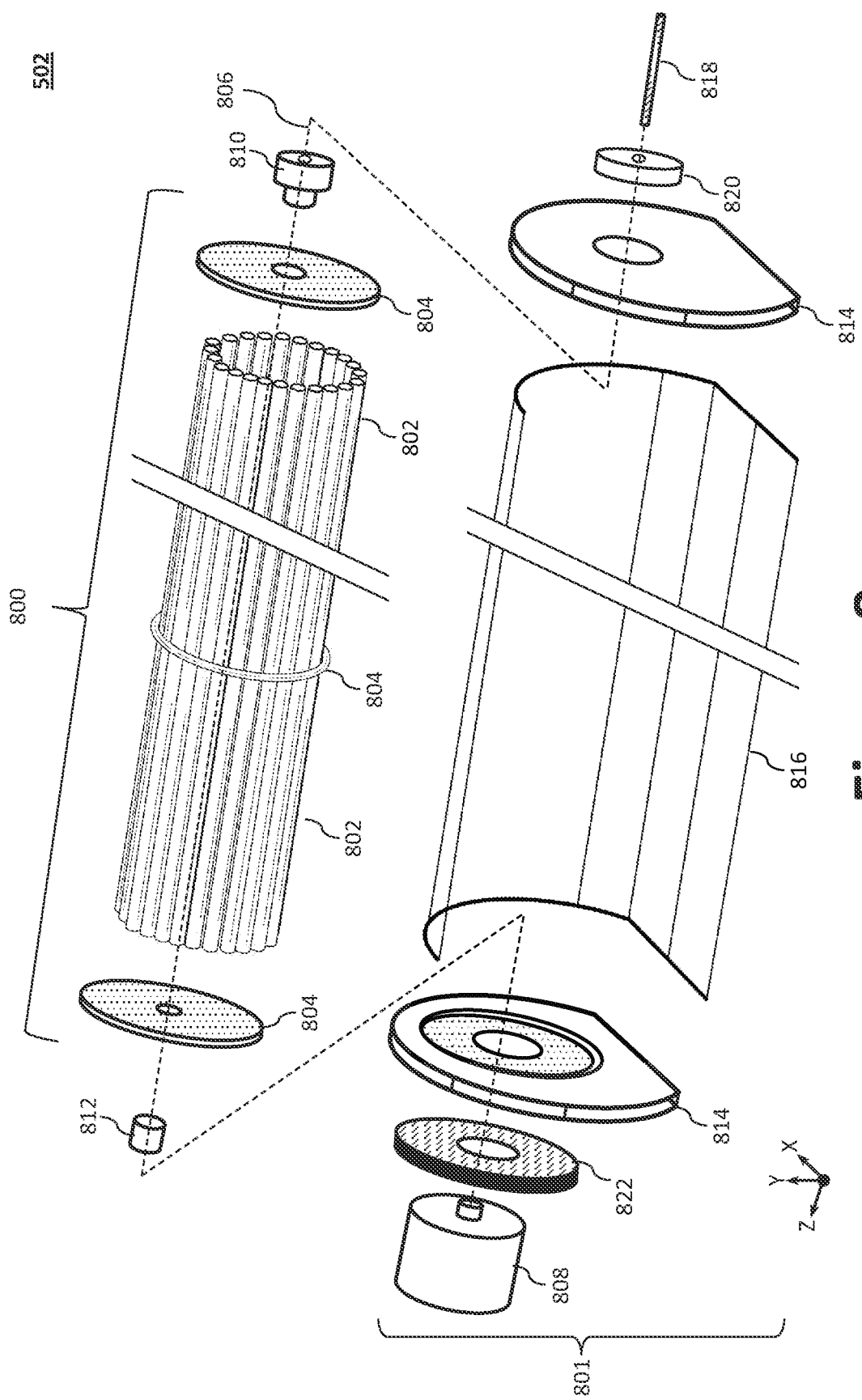
FIG. 8 illustrates an isometric assembly view of an example BLC actuator having a crossflow fan to convey fluid from a first surface of a foil to a second surface of the foil.

The BLC actuators 502 may employ, inter alia, motors 808 (e.g., electric motor) and crossflow/tangential type fans or blower wheels. FIG. 8 illustrates an isometric assembly view of a BLC actuator having a crossflow fan. As illustrated, a BLC actuator 502 may generally comprise a fan wheel 800 rotatably mounted to a housing assembly 801. The fan wheel 800 generally comprises a plurality of vanes or blades 802 and one or more circular support disks 804. For example, the plurality of blades 802 may be positioned between a set of outer circular support disks 804, where the plurality of blades 802 are positioned along the circumference of the circular support disks 804. Additional circular support disks 804 may be positioned between the outer circular support disks 804 to provide additional support and rigidity to the plurality of blades 802, thereby preventing the plurality of blades 802 from bending or warping when a mechanical force (torque) is applied. The blades 802 of the fan wheel 800 may be coupled to circular support disks 804 that revolve around an axis of rotation 806. The blades 802 may be curved to assist in capturing, displacing, accelerating, thrusting, propelling, directing and/or otherwise modifying fluid. The fan wheel 800 may include a sleeve 810 at one end and a link 812 at the other end, whereby the link 812 is configured to receive a rotational force from a mechanical device (e.g., the motor 808) and the sleeve 810 receives a shaft 818.

Crossflow/tangential or blower fan wheels 800 may be particularly suitable for BLC applications within an aircraft flight surface because of their form factor. Crossflow fans, such as the crossflow fan wheel 800 illustrated in FIG. 8, have elongated tubular and/or cylindrical profiles. That is, they occupy only a nominal foot print in the X-Y plane to permit embedment in a flight surface, but offer have a significant width (along the Z-Axis), which allows them to cover (whether alone or together with other crossflow fan wheel 800) the desired span-wise length of the flight surface.

The housing assembly 801 generally comprises a set of flanks 814 (e.g., left and right flanks) separated by a guiding plate 816. The width of guiding plate 816 is sized such that the distance between the set of flanks 814 accommodates the width of fan wheel 800. The shape of the guiding plate 816 is selected to guide air from one channel 506 (i.e., the channel 506 operating as the inlet) to another channel 506 (i.e., the channel 506 operating as the outlet). As illustrated, the right side of the fan wheel 800 is rotatably mounted to the right flank 814 via a shaft 818 and bearing assembly 820. The bearing assembly 820 serves to reduce friction between the shaft 818 and the sleeve 810 of the fan wheel 800. The left side of the fan wheel 800 is rotatably mounted to the left flank 814 via the electric motor 808 (e.g., via its motor shaft) and a motor mount 822 that secures the electric motor 808 to the left flank 814 (e.g., via one or more bolts).

Persons of ordinary skill in the art will understand that alternative embodiments may implement the invention using any suitable fluid moving actuator. For example, alternative embodiments may use a centrifugal fan, a radial fan, an axial fan, a backward curved fan or plug fan, a duplex fan, an impeller, a propeller, a turbine, and/or an electrostatic fluid accelerator. A funnel or other suitable fluid shaping device may be used to channel and shape the fluid flow to the extent necessary to conform the inlets and/or outputs of the BLC actuators 502 to the aircraft 200 inlets and/or outlets.

Each BLC actuator 502 may be driven by one or more electric motors 808. Alternatively, multiple BLC actuators 502 may be mechanically linked to share a single electric motor 808. The motor 808 may be powered by an electrical power supply, including, without limitation, batteries and/or an electrical generator. As a further alternative, the BLC actuators 502 may be driven by some other suitable mechanism, or may be powered by some other suitable source, as known by those of ordinary skill in the art. The amount of power or energy delivered to the BLC actuators 502 may be independently controlled and regulated, rather than being tied to the propulsion system of the aircraft 200 (or other vehicle). For example, the BLC actuators 502 may be independently controlled and regulated based on sensor data (e.g., representing flow conditions) from one or more sensors. The one or more sensors may include, for example, a Pitot tube, orifice plate, pressure probe, and the like. The sensor data may be analyzed (e.g., by an onboard system) to detect pressure differentials or flow separation. The rotational speed of the BLC actuator 502, such as when the actuator employs a fan, for example, can be affected by adjusting the amount of power delivered to the electric motor 808, which in turn can affect the amount of fluid that is affected by the BLC actuator 502 and/or the energy imparted to the fluid. As illustrated in FIG. 9a, power delivery from an electrical power supply 902 to a BLC actuator may be separately regulated and controlled, such that power for each individual BLC actuator 502a-502n may be raised, lowered, or otherwise altered independently of power level regulation for any other BLC actuator 502. Alternatively, as illustrated in FIG. 9b, power level may be more coarsely regulated, such that sets/groups of BLC actuators 502a-502n+1 are tied together with respect to raising, lowering, or otherwise altering power delivery. Electrical power from the electrical power supply 902 may be routed or delivered to the BLC actuators 502 through electrical wiring and/or other methods as known to those of ordinary skill in the art. Power delivery and/or BLC actuator 502 operations may be controllable through an actuator controller 900.

The actuator controller 900 may employ, for example, motor drive circuitry and a processor coupled with a memory device. In operation, the processor controls operation of the BLC actuator(s) 502 via the motor drive circuitry in accordance with instructions from another aircraft system, an operator (e.g., a pilot), and/or instructions (e.g., software) stored to the memory device. The actuator controller 900 may further be coupled with one or more sensors to provide feedback in real-time (or near real-time) regarding one or more operating parameters of the BLC actuator(s) 502 (e.g., motor speed, fan speed, airflow speed, temperature, pressure, etc.). For example, a pressure sensor system may be provided to collect a plurality of differential pressure measurements along the span of a wing's leading edge. An example distributed pressure sensor system is described in greater details by commonly owned U.S. Patent Application No. 62/454,188 to Riley Griffin et al., which was filed on Feb. 3, 2017 and is titled "System and Method for Distributed Airflow Sensing."

Actuator controller 900 may be controlled by a pilot or operator, automated by an electric and/or computer system of the aircraft 200, configured to automatically respond to aerodynamic forces during flight, and/or otherwise controllable through methods known to those of ordinary skill in the art. Therefore the actuator controller 900 may be communicatively coupled with other aircraft systems, such as the autopilot, aircraft control systems, flight controllers in the cockpit, etc.

A portion of the energy expended to drive the BLC actuators 502 may recovered as vectored thrust in the exhaust. For example, in operation, fluid may be ingested through the inlet apertures 504 during flight and channeled to the BLC actuators 502. The BLC actuators 502, implemented as crossflow fans, for example, may energize or accelerate the fluid to an elevated velocity and output the energized and/or accelerated fluid through the outlet apertures 504 on the upper surface 226 of the wings 204. The BLC actuators 502 at the trailing edge 232 of the wings 204 may additionally or alternatively output the fluid out over the flap 240 knees or joints 242, and/or across the upper surface 226 of the wings 204 and/or flaps 240. The output fluid may in turn energize, accelerate, or otherwise modify the boundary layer adjacent the upper surface 226 of the wings 204 and/or flaps 240. The boundary layer may be accelerated up to and/or past the speed of the free stream in order to delay separation of the boundary layer over the upper surface 226 of the wing 204. This delayed separation can raise the maximum lift coefficient and allow for steeper alterations of altitude using reduced speeds that may have otherwise resulted in the aircraft 200 stalling.

During flight, fluid may also be ingested through the inlet apertures 504 in the tail 248 horizontal stabilizers 512 and channeled to the BLC actuators 502. The BLC actuators 502 may energize or accelerate the fluid to an elevated velocity and output the energized and/or accelerated fluid through the outlet apertures 504 on the lower surface 528 of the horizontal stabilizers 512. The BLC actuators 502 may additionally or alternatively output the fluid out over the elevator 214 knees or joints 242, and/or across the surface 528 of the horizontal stabilizers 512 and/or elevators 214. The output fluid may in turn energize, accelerate, or otherwise modify the boundary layer adjacent the surface 528 of the horizontal stabilizers 512 and/or elevators 214. The boundary layer may be accelerated up to and/or past the speed of the free stream in order to delay separation of the boundary layer over the surface 528 of the horizontal stabilizers 512 and/or elevators 214. This delayed separation can raise the maximum lift coefficient and allow for steeper alterations of altitude using reduced speeds that may have otherwise resulted in the aircraft 200 stalling.

During flight, fluid may additionally be ingested through the inlet apertures 504 in the tail 248 vertical stabilizer 216 and channeled to the BLC actuator 502. The BLC actuator 502 may energize or accelerate the fluid to an elevated velocity and output the energized and/or accelerated fluid through the outlet aperture 504 of the vertical stabilizer 216. The BLC actuator 502 may additionally or alternatively blow the fluid out over the rudder 218 knee or joint 242, and/or across the surfaces 250a, 250b of the rudder 218 and/or vertical stabilizer 216. The output fluid may in turn energize, accelerate, or otherwise modify the boundary layer adjacent the surface 250a, 250b of the horizontal stabilizers 512 and/or elevators 214. The boundary layer may be accelerated up to and/or past the speed of the free stream in order to delay separation of the boundary layer over the surface 250a, 250b of the horizontal stabilizers 512 and/or elevators 214. This delayed separation may raise the maximum lift coefficient and allow for steeper alterations of altitude using reduced speeds that may have otherwise resulted in the aircraft 200 stalling.

During flight, the rudder 218 may need to provide lift in two different and/or opposite directions. To achieve lift in a first direction, the rudder 218 may rotate, creating an angle between the rudder and the horizontal stabilizer 212 defining its axis of rotation. To create lift in an opposite, second direction, the rudder 218 may rotate in the opposite direction, creating an angle in between the rudder and the horizontal stabilizer 212 in the opposite direction. Thus, the BLC actuator 502 may be configured to change its direction of operation, to output fluid on either side of the horizontal stabilizer 212, depending on the rotation of the rudder 218 and the intended resulting lift direction. When implemented as a fan, for example, the BLC actuator 502 may be configured to change its direction of rotation when the rudder 218 changes its lift direction. By changing its direction the BLC actuator 502 may act on local and/or ambient fluid in the opposite direction and output the fluid on the opposite side of the horizontal stabilizer 212. When changing its direction of operation, the BLC actuator 502 may also change the channel 506 it uses and/or the apertures 504 it uses as its inlet and/or outlet aperture. In some embodiments, the fluid channels 506 and/or apertures 504 that are not in use may be closed and/or sealed using a movable door, and/or by operation of the rudder 218 itself.

In some embodiments, multiple BLC actuators 502 may be used, with the BLC actuators 502 operating primarily in opposite directions. In such an embodiment, a first actuator may output primarily to one side of the horizontal stabilizer 212 when appropriate for the intended lift direction of the rudder 218, while the second BLC actuator 502 may cease or substantially reduce its operation. If and when lift is desired in the opposite direction, and the rudder 218 rotates in the opposite direction, the operations of the BLC actuators 502 may reverse, with the first BLC actuator 502 ceasing or substantially reducing its operation, while the second BLC actuator 502 begins or substantially increases its operation in order to output to the other side of the horizontal stabilizer 212. In some embodiments, the fluid channels 506 and/or apertures 504 that are not in use may be closed and/or sealed using a movable door, and/or by operation of the rudder 218 itself.

As noted above, during high speed flight and/or during periods of non-use or reduced usage, the apertures 504 and/or channels 506 leading to and/from the BLC actuators 502 may be closed in order to reduce drag. In some embodiments, the apertures 504 and/or channels may be closed and/or sealed using a movable door 1000, as illustrated, for example, in FIGS. 10a and 10b. In some embodiments, such as those described in relation to FIGS. 6c and 6d, the apertures 504 and/or channels may be closed and/or sealed by operation of the movable flight surfaces near the apertures 504 and/or channels 506. For instance, the apertures 504 and channels 506 associated with the wing 204 leading edge 230 BLC actuators 502 may be closed and/or sealed by the adjacent slats 234 when the slats 234 are retracted to their position flush with the rest of the wing 204. As a further example, the apertures 504 and channels 506 associated with the wing 204 trailing edge 232 BLC actuators 502 may be closed and/or sealed by the adjacent flaps 240 (and/or ailerons and/or flaperons) when the flaps 240 are retracted and/or rotated to their position flush and substantially in line with the rest of the wing 204, where there is little or substantially no angle formed between the flap 240 and the wing 204. As yet another example, the apertures 504 and channels 506 associated with horizontal stabilizer 212 elevator 214 BLC actuators 502 may be closed and/or sealed by the adjacent elevators 214 when the elevators 214 are rotated to a position substantially in line with the rest of the horizontal stabilizer 212, where there is little or substantially no angle formed between the elevator 214 and the horizontal stabilizer 212.

FIGS. 10a and 10b illustrate a gate or slot door 1000 (e.g., small strip doors) that may be used to close or seal a channel 506 and/or aperture 504 leading to a BLC actuator 502. Each channel 506 may be selectively sealed/blocked using a slot door 1000. FIGS. 10a and 10b each illustrate the slot doors 410 transitioning from an open position (i.e., allowing airflow through the channel 506) to a closed position (i.e., blocking airflow through the channel 506). The slot doors 410 in FIG. 10b, for example, may be lightly sprung to ensure that they open or close properly. As illustrated in the figures, the door or gate 1000 may be recessed when the channel 506 and/or aperture 504 is open, and may slide, shift, and/or otherwise move into a sealing and/or closing position to close and/or seal the aperture 504 and/or channel 506. Alternatively, or additionally, the door or gate 1000 may rotate and/or swing into a closing position from a recessed and/or open position. Alternatively, or additionally, the fluid channels 506 and/or apertures 504 may be opened and/or closed by any other means known to those of ordinary skill in the art. Opening and closing of the apertures 504 and/or channels may be controllable by a pilot or operator, automated by an electric and/or computer system, configured to automatically respond to hydrodynamic and/or aerodynamic forces during, and/or otherwise controllable through methods known to those of ordinary skill in the art.

Figure 11:
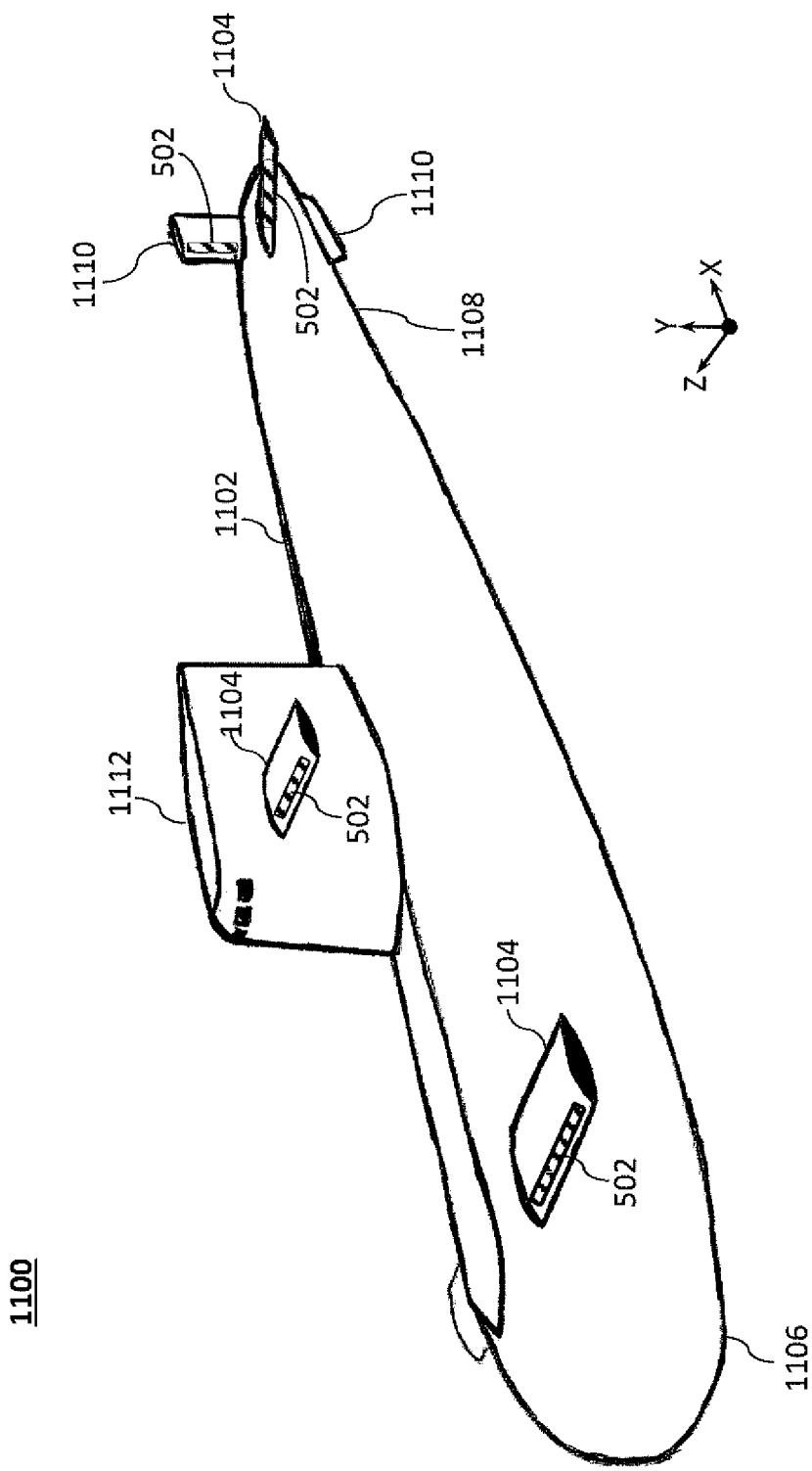
FIG. 11 illustrates an isometric view of an example submarine having a plurality of BLC actuators.

While the BLC actuator 502 and various BLC schemes have been described primarily in relation to aircraft, the principles are applicable to other devices having an airfoil to pass through a fluid, including marine craft. FIG. 11, for example, illustrates one such alternative embodiment where BLC actuators 502 are implemented in a marine craft, particularly a submarine 1100. The submarine 1100 may include a sail 1112 and a main body 1102 having a forward or bow portion 1106 and an aft, rear, tail, or stern 1108 portion. The submarine 1100 may include one or more vertical tail planes 1116 near the tail portion 1108 of the ship. The vertical tail planes 1116 may include one or more rudders 1110 rotatably and/or hingedly coupled to the vertical tail planes at a knee or joint, such that the rudders 1110 may swing about an axis defined by the connection to the vertical tail planes 1116. The rudder 1110 may additionally and/or alternatively be configured with a mechanism to allow for other, non-rotatable movement, such as, for example, sliding movement. In alternative embodiments, the rudder 1110 may be coupled to the vertical tail planes 1116 in such a way as to be substantially fixed in place. In a further alternative, the rudder 1110 may be omitted entirely. The submarine 1100 may also include hydroplanes or diving planes 1104, each having a hydrofoil cross section. A hydrofoil, which shares an overall appearance and purpose with the airfoils of the aircraft 200, is a lifting surface, or foil, that operates in water instead of air.

The submarine 1100 may include diving planes on its sail 1112, as well as bow 1106 diving planes 1104 and stern 1108 diving planes. In some embodiments, there may be more or fewer diving planes, depending on the design and desired operation of the ship. The diving planes 1104 may be rotatably and/or hingedly coupled to the body 1102 of the ship to allow the ship to pitch its bow 1106 and/or stern 1108 up and/or down when it is underwater. In such a case, rotating or tilting the diving planes 1104 upwards or downwards may affect the lift and/or depth of the submarine 1100, and/or may assist in changing the depth of the boat when submerging or surfacing, for example. The position and movement of the diving planes 1104 and rudders 1110 may be controllable by a pilot or operator, automated by an electronic and/computer system of the submarine 1100, and/or may be configured to automatically respond to hydrodynamic forces during operation.

In operation, the diving planes 1104 of the submarine 1100 act as hydrofoils when underwater, similar to the airfoils of an aircraft during flight. Accordingly, one or more BLC actuators 502 may be similarly mounted in, on, and/or substantially adjacent each diving plane 1104 of the submarine 1100, akin to the BLC actuators 502 mounted with respect to the wings 204 and/or horizontal stabilizer 212 of the previously disclosed aircraft 200. In some embodiments, some diving planes 1104 may have one or more actuators mounted thereon and/or therein, while other diving planes 1104 have no actuators are mounted thereon and/or therein. For example, the arrangements illustrated and described in connection with FIGS. 6a through 6d and 7a may be applied to the diving planes 1104 of the submarine 1100. Similarly, the arrangements illustrated and described in connection with FIGS. 7b and 7c may be applied to the rudders 1110 of the submarine 1100.

As can be appreciated, however, water proofing measures may be implemented with the various components of the BLC actuators 502. For example, to counter the effects of salt water, the components of the BLC actuators 502 may be fabricated from non-corrosive material. Moreover, because water has a density that is higher than air, the various components may be scaled up and/or, because weight is of a lesser concern, manufactured using heavier and stronger materials. For example, the BLC actuator 502 may be embodied as an impeller and be configured to change its direction and/or rate of spin or rotation depending on the direction of rudder 1110 rotation, the desired direction of the submarine 1100, and/or the desired position, movement, and/or angle of the rudder 1110.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. A boundary layer control (BLC) system for a flight surface, the flight surface having a top surface, a bottom surface, a leading edge, and a trailing edge, the BLC system comprising:
   an actuator having a crossflow fan and a motor to drive the crossflow fan about an axis of rotation, wherein the actuator is embedded within the flight surface and adjacent the leading edge, wherein the actuator is configured to output local airflow via an outlet channel through an outlet aperture adjacent the top surface to energize a boundary layer of air adjacent the top surface of the flight surface; and
   a second actuator having a second crossflow fan and a second electric motor to drive the second crossflow fan about a second axis of rotation.

2. The BLC system of claim 1, wherein the actuator is configured to ingest the local airflow via an inlet channel through an inlet aperture on the bottom surface.

3. The BLC system of claim 2, wherein the flight surface includes at least one movable door configured to close the inlet aperture and the outlet aperture.

4. The BLC system of claim 1, wherein the flight surface includes a slat that is movable between an extended position and a retracted position, wherein the slat defines a leading edge slot in the extended position.

5. The BLC system of claim 4, wherein the outlet aperture is positioned on the leading edge and within the leading edge slot.

6. The BLC system of claim 5, wherein the slat is configured to block the outlet aperture when in the retracted position.

7. The BLC system of claim 1,
   wherein the second actuator is embedded within the flight surface and adjacent the trailing edge to output local airflow over a knee of a flap coupled at the trailing edge to energize a boundary layer of air adjacent a surface of the flap.

8. An aircraft having boundary layer control, the aircraft comprising:
   a fuselage;
   a fixed wing operatively coupled to the fuselage, wherein the fixed wing includes a top surface, a bottom surface, a leading edge, and a trailing edge; and
   an actuator having a crossflow fan and a motor to drive the crossflow fan about an axis of rotation, wherein the actuator is embedded within the fixed wing and adjacent the leading edge, wherein the actuator is configured to output local airflow via an outlet channel through an outlet aperture adjacent the top surface to energize a boundary layer of air adjacent the top surface of the fixed wing; and
   a second actuator having a second crossflow fan and a second electric motor to drive the second crossflow fan about a second axis of rotation.

9. The aircraft of claim 8, wherein the actuator is configured to ingest the local airflow via an inlet channel through an inlet aperture on the bottom surface.

10. The aircraft of claim 8,
    wherein the second actuator is embedded within the fixed wing and adjacent the trailing edge to output local airflow over a knee of a flap coupled at the trailing edge to energize a boundary layer of air adjacent a surface of the flap.

11. An aircraft wing comprising:
    an upper wing surface and a lower wing surface, wherein the upper wing surface and lower wing surface merge into a leading edge and a trailing edge;
    an actuator having a crossflow fan and a motor to drive the crossflow fan about an axis of rotation, wherein the actuator is embedded between the upper wing surface and the lower wing surface and adjacent the leading edge, wherein the actuator is configured to blow local airflow through an outlet aperture positioned to coincide with a stagnation point of the leading edge to energize a boundary layer air adjacent the aircraft wing.

12. The aircraft wing of claim 11, wherein the actuator is configured to ingest the local airflow via an inlet channel through an inlet aperture on the lower wing surface.

13. The aircraft wing of claim 12, wherein the aircraft wing includes at least one movable door configured to close the inlet aperture and the outlet aperture.

14. The aircraft wing of claim 11, wherein the aircraft wing includes a slat that is movable between an extended position and a retracted position, wherein the slat defines a leading edge slot in the extended position.

15. The aircraft wing of claim 11, wherein the crossflow fan is operated as a function of sensor data from at least one sensor that reflects one or more flow conditions about the aircraft wing.

16. The aircraft wing of claim 11, wherein the actuator is positioned forward of a front spar of the aircraft wing.

17. The aircraft wing of claim 11, wherein the axis of rotation is parallel to a portion of the leading edge adjacent the actuator.

18. The aircraft wing of claim 11, wherein energy expended to drive the actuator is recovered as vectored thrust in exhaust.

19. The aircraft wing of claim 11, further comprising a second actuator having a second crossflow fan and a second electric motor to drive the second crossflow fan about a second axis of rotation, wherein the second actuator is embedded between the upper wing surface and the lower wing surface and adjacent the trailing edge to output local airflow over a surface of a control surface coupled to the trailing edge to energize a boundary layer of air adjacent a surface of an elevator of the aircraft wing.

* * * * *